United States Patent [19]
Massie et al.

[11] Patent Number: 5,898,599
[45] Date of Patent: * Apr. 27, 1999

[54] FORCE REFLECTING HAPTIC INTERFACE

[75] Inventors: Thomas H Massie, Vanceburg, Ky.; J. Kenneth Salisbury, Jr., Cambridge, Mass.

[73] Assignee: Massachusetts Institute of Technology, Cambridge, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/771,484

[22] Filed: Dec. 23, 1996

Related U.S. Application Data

[63] Continuation of application No. 08/130,639, Oct. 1, 1993, Pat. No. 5,625,576.

[51] Int. Cl.⁶ .................................................. G05B 11/01
[52] U.S. Cl. ............................................. 364/578; 318/628
[58] Field of Search ........................... 318/628; 364/578; 395/99

[56] References Cited

U.S. PATENT DOCUMENTS

| | | | |
|---|---|---|---|
| 2,475,484 | 7/1949 | DeNise | 318/628 |
| 2,906,179 | 9/1959 | Bower | 90/13.5 |
| 3,133,649 | 5/1964 | Serrell | 214/1 |
| 3,139,990 | 7/1964 | Jelatis et al. | 214/1 |
| 3,168,203 | 2/1965 | Gallistel | 214/1 |
| 3,171,549 | 3/1965 | Orloff | 214/1 |
| 3,241,687 | 3/1966 | Orloff | 214/1 |
| 3,263,824 | 8/1966 | Jones et al. | 214/1 |
| 3,269,826 | 8/1966 | Bumgarner | 75/10 |
| 3,296,882 | 1/1967 | Durand | 74/471 |
| 3,350,956 | 11/1967 | Monge | 74/471 |
| 3,409,252 | 11/1968 | Miller | 244/83 |
| 3,447,766 | 6/1969 | Palfreyman | 244/83 |
| 3,449,008 | 6/1969 | Colechia | 294/88 |
| 3,531,868 | 10/1970 | Stevenson | 33/174 |
| 3,561,263 | 2/1971 | Ward et al. | 73/133 |
| 3,618,786 | 11/1971 | Fick | 214/1 CM |
| 3,620,095 | 11/1971 | Dane | 74/469 |
| 3,637,092 | 1/1972 | George et al. | 214/1 CM |

(List continued on next page.)

FOREIGN PATENT DOCUMENTS

WO 95/02801  1/1995  WIPO.

OTHER PUBLICATIONS

Adachi, "Touch and Trace on the Free–Form Surface of Virtual Object"; Proceedings of IEEE Virtual Reality Annual Symposium; Seattle, WA.; Sep. 18–22, 1993; pp. 162–168.

B.A. Marcus, et al., "EXOS Research on Master Controllers for Robotic Devices," Fifth Annual Workshop On Space Operations Applications And Research (SOAR '91), pp. 238–245, Jul. 1991.

(List continued on next page.)

*Primary Examiner*—Edward R. Cosimano
*Attorney, Agent, or Firm*—Testa, Hurwitz & Thibeault, LLP

[57] ABSTRACT

An apparatus and method for physically exchanging a force with a user in a user-local environment. The apparatus includes a user connection element and a linkage physically linking the user connection element to a reference. The linkage provides at least six independent degrees of freedom to the user connection element. The linkage has an actuator system which powers at least three degrees of freedom of the user connection element, while at least three degrees of freedom remain unpowered. The method includes providing an apparatus which includes a user connection element and a linkage physically linking the user connection element to a reference, the linkage providing at least six independent degrees of freedom to the user connection element. The linkage of the apparatus provided has an actuator system which powers at least three of the six independent degrees of freedom relative to the reference. The method further includes connecting the user connection element to a body member of a user and powering at least three of the six independent degrees of freedom.

52 Claims, 10 Drawing Sheets

U.S. PATENT DOCUMENTS

| | | | |
|---|---|---|---|
| 3,679,865 | 7/1972 | Jesnitzer et al. | 219/131 R |
| 3,771,037 | 11/1973 | Bailey, Jr. | 318/580 |
| 3,890,958 | 6/1975 | Fister et al. | 128/2 S |
| 3,920,972 | 11/1975 | Corwin, Jr. et al. | 235/151.11 |
| 3,944,798 | 3/1976 | Eaton | 235/151.3 |
| 3,948,093 | 4/1976 | Folchi et al. | 73/133 R |
| 4,021,715 | 5/1977 | Von Hacht et al. | 318/628 |
| 4,062,455 | 12/1977 | Flatau | 214/1 |
| 4,150,803 | 4/1979 | Fernandez | 244/135 A |
| 4,216,467 | 8/1980 | Colston | 340/365 |
| 4,221,516 | 9/1980 | Haaker et al. | 414/5 |
| 4,229,136 | 10/1980 | Panissidi | 414/673 |
| 4,260,319 | 4/1981 | Motoda et al. | 414/591 |
| 4,302,138 | 11/1981 | Zarudiansky | 414/5 |
| 4,348,142 | 9/1982 | Figour | 414/2 |
| 4,367,532 | 1/1983 | Crum et al. | 364/513 |
| 4,420,808 | 12/1983 | Diamond et al. | 364/434 |
| 4,459,870 | 7/1984 | Gill et al. | 74/471 |
| 4,477,973 | 10/1984 | Davies | 33/1 CC |
| 4,510,574 | 4/1985 | Guittet et al. | 364/513 |
| 4,511,985 | 4/1985 | Inaba et al. | 364/513 |
| 4,521,685 | 6/1985 | Rebman | 250/229 |
| 4,531,080 | 7/1985 | Nordstrom et al. | 318/628 |
| 4,555,960 | 12/1985 | King | 74/471 XY |
| 4,571,834 | 2/1986 | Fraser et al. | 33/1 PT |
| 4,593,470 | 6/1986 | Davies | 33/1 CC |
| 4,604,016 | 8/1986 | Joyce | 414/7 |
| 4,632,341 | 12/1986 | Repperger et al. | 244/230 |
| 4,638,798 | 1/1987 | Shelden et al. | 128/303 B |
| 4,648,782 | 3/1987 | Kraft | 414/735 |
| 4,653,011 | 3/1987 | Iwano | 364/513 |
| 4,654,648 | 3/1987 | Herrington et al. | 340/710 |
| 4,655,673 | 4/1987 | Hawkes | 414/730 |
| 4,661,032 | 4/1987 | Arai | 414/5 |
| 4,670,851 | 6/1987 | Murakami et al. | 364/518 |
| 4,676,002 | 6/1987 | Slocum | 33/1 MP |
| 4,679,331 | 7/1987 | Koontz | 33/551 |
| 4,680,519 | 7/1987 | Chand et al. | 318/568 |
| 4,703,443 | 10/1987 | Moriyasu | 364/559 |
| 4,750,487 | 6/1988 | Zanetti | 128/303 B |
| 4,769,763 | 9/1988 | Trieb et al. | 364/559 |
| 4,787,051 | 11/1988 | Olson | 364/518 |
| 4,791,934 | 12/1988 | Brunnett | 128/653 |
| 4,795,296 | 1/1989 | Jau | 414/5 |
| 4,800,721 | 1/1989 | Cemenska et al. | 60/393 |
| 4,819,195 | 4/1989 | Bell et al. | 364/571.05 |
| 4,837,734 | 6/1989 | Ichikawa et al. | 364/513 |
| 4,839,838 | 6/1989 | LaBiche et al. | 364/709.11 |
| 4,849,692 | 7/1989 | Blood | 324/208 |
| 4,853,874 | 8/1989 | Iwamoto et al. | 364/513 |
| 4,879,556 | 11/1989 | Duimel | 341/20 |
| 4,887,222 | 12/1989 | Miyake et al. | 364/513 |
| 4,888,538 | 12/1989 | Dimitrov et al. | 318/675 |
| 4,888,877 | 12/1989 | Enderle et al. | 33/559 |
| 4,891,889 | 1/1990 | Tomelleri | 33/503 |
| 4,893,981 | 1/1990 | Yoshinada et al. | 414/5 |
| 4,895,039 | 1/1990 | Hegg | 74/471 XY |
| 4,907,970 | 3/1990 | Meenen, Jr. | 434/45 |
| 4,907,973 | 3/1990 | Hon | 434/262 |
| 4,913,000 | 4/1990 | Wyllie | 74/523 |
| 4,914,976 | 4/1990 | Wyllie | 74/523 |
| 4,942,538 | 7/1990 | Yuan et al. | 364/513 |
| 4,942,545 | 7/1990 | Sapia | 364/571.01 |
| 4,945,305 | 7/1990 | Blood | 324/207.17 |
| 4,945,501 | 7/1990 | Bell et al. | 364/571.05 |
| 4,961,138 | 10/1990 | Gomiak | 364/200 |
| 4,962,448 | 10/1990 | DeMaio et al. | 364/146 |
| 4,962,591 | 10/1990 | Zeller et al. | 33/502 |
| 4,973,215 | 11/1990 | Karlen et al. | 414/729 |
| 4,982,504 | 1/1991 | Söderberg et al. | 33/502 |
| 4,988,981 | 1/1991 | Zimmerman et al. | 345/158 |
| 5,004,391 | 4/1991 | Burdea | 414/6 |
| 5,007,085 | 4/1991 | Greanias et al. | 380/25 |
| 5,007,300 | 4/1991 | Siva | 74/471 X |
| 5,018,922 | 5/1991 | Yoshinada et al. | 414/5 |
| 5,019,761 | 5/1991 | Kraft | 318/568.11 |
| 5,024,116 | 6/1991 | Kraft | 74/109 |
| 5,038,089 | 8/1991 | Szakaly | 318/568.11 |
| 5,040,306 | 8/1991 | McMurtry et al. | 33/556 |
| 5,044,956 | 9/1991 | Behensky et al. | 434/45 |
| 5,050,608 | 9/1991 | Watanabe et al. | 128/653 R |
| 5,053,975 | 10/1991 | Tsuchihashi et al. | 364/513 |
| 5,072,361 | 12/1991 | Davis et al. | 364/167.01 |
| 5,088,046 | 2/1992 | McMurtry | 364/474.03 |
| 5,088,055 | 2/1992 | Oyama | 364/560 |
| 5,095,303 | 3/1992 | Clark et al. | 340/710 |
| 5,103,404 | 4/1992 | McIntosh | 318/568.22 |
| 5,105,367 | 4/1992 | Tsuchihashi et al. | 395/99 |
| 5,115,178 | 5/1992 | Umeda | 318/568.11 |
| 5,116,051 | 5/1992 | Moncrief et al. | 273/448 B |
| 5,116,180 | 5/1992 | Fung et al. | 414/5 |
| 5,128,671 | 7/1992 | Thomas, Jr. | 341/20 |
| 5,130,632 | 7/1992 | Ezawa et al. | 318/568.11 |
| 5,131,844 | 7/1992 | Marinaccio et al. | 433/72 |
| 5,132,672 | 7/1992 | Clark | 340/710 |
| 5,139,261 | 8/1992 | Openiano | 273/148 B |
| 5,142,506 | 8/1992 | Edwards | 367/127 |
| 5,142,931 | 9/1992 | Menahem | 74/471 XY |
| 5,143,505 | 9/1992 | Burdea et al. | 414/5 |
| 5,148,377 | 9/1992 | McDonald | 364/560 |
| 5,155,423 | 10/1992 | Karlen et al. | 318/568.11 |
| 5,181,181 | 1/1993 | Glynn | 364/566 |
| 5,184,319 | 2/1993 | Kramer | 364/806 |
| 5,185,561 | 2/1993 | Good et al. | 318/432 |
| 5,187,874 | 2/1993 | Takahshi et al. | 33/502 |
| 5,189,806 | 3/1993 | McMurtry et al. | 33/503 |
| 5,193,963 | 3/1993 | McAffee et al. | 414/5 |
| 5,198,736 | 3/1993 | Azuma et al. | 318/568.1 |
| 5,204,824 | 4/1993 | Fujimaki | 364/474.03 |
| 5,220,260 | 6/1993 | Schuler | 318/561 |
| 5,220,261 | 6/1993 | Kempas | 318/567 |
| 5,223,776 | 6/1993 | Radke et al. | 318/568.1 |
| 5,230,623 | 7/1993 | Guthrie et al. | 433/72 |
| 5,239,160 | 8/1993 | Sakura et al. | 219/121.82 |
| 5,239,246 | 8/1993 | Kim | 318/568.11 |
| 5,251,127 | 10/1993 | Raab | 364/413.13 |
| 5,251,156 | 10/1993 | Heier et al. | 364/559 |
| 5,255,211 | 10/1993 | Redmond | 364/578 |
| 5,259,120 | 11/1993 | Chapman et al. | 33/502 |
| 5,264,768 | 11/1993 | Gregory et al. | 318/561 |
| 5,266,875 | 11/1993 | Slotine et al. | 395/99 X |
| 5,275,565 | 1/1994 | Moncrief | 434/29 |
| 5,350,033 | 9/1994 | Kraft | 180/167 |
| 5,351,692 | 10/1994 | Dow et al. | 128/662.06 |
| 5,354,162 | 10/1994 | Burdea et al. | 414/5 |
| 5,379,663 | 1/1995 | Hara | 74/471 XY |
| 5,382,885 | 1/1995 | Salcudean et al. | 318/568.11 |
| 5,389,865 | 2/1995 | Jacobus et al. | 318/568.11 |
| 5,396,265 | 3/1995 | Ulrich et al. | 345/158 |
| 5,397,323 | 3/1995 | Taylor et al. | 606/130 |
| 5,402,582 | 4/1995 | Raab | 33/503 |
| 5,414,337 | 5/1995 | Schuler | 318/561 |
| 5,417,696 | 5/1995 | Kashuba et al. | 606/9.1 |
| 5,429,140 | 7/1995 | Burdea et al. | 128/774 |
| 5,445,166 | 8/1995 | Taylor | 128/897 |
| 5,459,382 | 10/1995 | Jacobus et al. | 318/568.11 |
| 5,467,763 | 11/1995 | McMahon et al. | 600/201 |
| 5,489,830 | 2/1996 | Fernandez | 318/628 |
| 5,497,452 | 3/1996 | Shimizu et al. | 395/120 |
| 5,515,078 | 5/1996 | Greschler et al. | 354/156 |
| 5,559,412 | 9/1996 | Schuler | 318/561 |
| 5,576,727 | 11/1996 | Rosenberg et al. | 345/179 |

| | | | |
|---|---|---|---|
| 5,587,937 | 12/1996 | Massie et al. | 364/578 |
| 5,589,828 | 12/1996 | Armstrong | 341/20 |
| 5,623,642 | 4/1997 | Katz et al. | 395/500 |
| 5,625,576 | 4/1997 | Massie et al. | 364/578 |
| 5,629,594 | 5/1997 | Jacobus et al. | 318/568.11 |
| 5,659,480 | 8/1997 | Anderson et al. | 364/474.28 |
| 5,724,264 | 3/1998 | Rosenberg et al. | 364/559 |
| 5,734,373 | 3/1998 | Rosenberg et al. | 345/161 |
| 5,751,289 | 5/1998 | Myers | 345/419 |
| 5,769,640 | 6/1998 | Jacobus et al. | 434/262 |
| 5,771,181 | 6/1998 | Moore et al. | 364/578 |
| 5,798,752 | 8/1998 | Buxton et al. | 345/146 |

OTHER PUBLICATIONS

P.H. Sutter, et al., "Response to Reflected–Force Feedback to Fingers in Teleoperations," *Proc. of the NASA Conf. on Space Telerobotics*, pp. 65–74, NASA JPL, Jan. 1989.

Y. Adachi, "Touch and Trace on the Free–Form Surface of Virtual Object," *Proceedings of IEEE Virtual Reality Annual Interanational Symposium*, Sep. 18–22, 1993, Seattle WA, pp. 162–168.

Atkinson, W.D. et al., "Computing with Feeling" *Comput. & Graphics*, vol. 2, 1977, pp. 97–103.

Barr, Alan H.; "Global and Local Deformations of Solid Primitives"; *Computer Graphics*; vol. 18, No. 3, pp. 21–30 (Jul., 1984).

Bergamasco, "Design of Hand Force Feedback Systems for Glove–like Advanced Interfaces", IEEE, Sep. 1992, pp. 286–293.

Blinn, J.F., "Simulation of Wrinkled Surfaces," *Computer Graphics*, vol. 12–3, Aug. 1978, pp. 286–292.

Brooks, F.P. et al., "Project GROPE –Haptic Displays for Scientific Visualization," *Computer Graphics*, vol. 24, No. 4, Aug. 1990, pp. 177–185.

Dworkin, Paul, et al., "A New Model for Efficient Dynamic," *Fourth Eurographics Animation and Simulation Workshop Proceedings Eurographic Technical Report Series*, ISSN 1017–4656, Sep. 4–5, 1993, pp. 135–147.

Kotoku, T., et al., "A Force Display Algorithm for Virtual Environments", *SICE*, pp. 347–355, 1992.

Hashimoto et al., "Dynamic Force Simulator for Force Feedback Human–Machine Interaction", IEEE, Sep. 1993, pp. 209–215.

Harbur, Steve, "Kraft Telerobotics," Kraft Telerobotics, Inc. 1988, pp. 1–10.

Hirata, Yukihiro et al., "3 Dimensional Interface Device for Virtual Work Space," *Proceedings of the 1992 IEEE*, Jul. 7–10, 1992, pp. 889–896.

Tanie, K., et al., "Force Display Algorithms", 1993 IEEE International Conference on Robotics and Automation, May 2–7, 1993, Atlanta, GA, USA, 1993, pp. 661–678.

Howe, Robert D. et al., "Task Performance with a Dextrous Teleoperated Hand System," *Telemanipulator Technology*, Nov. 1992, Proceedings of SPIE, vol. 1833, pp. 1–9.

H. Inoue, Y. Tsusaka and T. Fukuizumi, "Parallel Manipulator," Proceedings of 3rd Robotics Research: The Third International Symposium, *Faugeras & Giralt*, eds., MIT Press 1986.

Ishii et al., "*A 3D Interface Device with Force Feedback: A Virtual Work Space for Pick–and–Place Tasks*", IEEE, Sep. 1993, pp. 331–335.

H. Iwata, "Pen–based Haptic Virtual Environment," *Proceedings of IEEE Virtual Reality Annual International Symposium*, (Sep. 18–22, 1993, Seattle, WA), pp. 287–292.

Kraft Ocean Systems, "*Grips Underwater Manipulator System*".

Kraft Telerobotics, Inc., "GRIPS Force Feedback Manipulator System" *Kraft Telerobotics*, Inc.

Kraft Telerobotics, Inc., "GRIPS Master/Slave Manipulator System," *Kraft Telerobotics*, Inc., 1988.

B.A. Marcus, B. An, and B. Eberman, "EXOS Research on Master Controllers for Robotic Devices," *Fifth Annual Workshop On Space Operations Applications And Research* (SOAR '91) pp. 238–245, Jul. 1991.

Massie, T. H., "*Design of a Three Degree of Freedom Force–Reflecting Haptic Interface*" Massachusetts Institute of Technology; Bachelor of Science in Electrical and Engineering Thesis, May, 1993, pp. 1–38. (Not admitted as prior art).

McAffee, Douglas A. and Ohm, Timothy, "Teleoperator Subsystem/Telerobot Demonstrator," *Force Reflecting Hand Controller Equipment Manual*, Jet Propulsion Laboratory, Jan. 1988.

Minsky, M. et al., "Feeling and Seeing: Issues in Force Display," *Computer Graphics*, vol. 24, No. 2, Mar. 1990, pp. 235–270.

Shimoga, K.B., "A Survey of Perceptual Feedback Issues in Dextrous Telemanipulation: Part I. Finger Force Feedback" published by IEEE Neural Networks Council in *IEEE Virtual Reality Annual International Symposium*, held Sep. 18–22, 1993 in Seattle, Washington, 1993, pp. 263–270.

Snow, E. et al., "Compact Force–Reflecting Hand Controller," *NASA Tech Brief*, vol. 15, No. 4 from Jet Propulsion Laboratory Report NPO–17851–7348, Apr. 1991, pp. i, 1–3, 1a–11a, 14a, 15a.

P.H. Sutter, J.C. Iatridis and N.V. Thakor, "Response to Reflected–Force Feefback to Fingers in Teleoperations," *Proc. of the NASA Conf. on Space Telerobotics*, pp. 65–74, NASA JPL, Jan. 1989.

Terzopoulos, D. et al.; "Elastically Deformable Models"; *Computer Graphics*, vol. 21, No. 4, pp. 205–214 (Jul., 1987).

FORCE REFLECTING HAPTIC INTERFACE

This is a continuation of application Ser. No. 08/130,639, filed on Oct. 1, 1993, now U.S. Pat. No. 5,625,576, issued Apr. 29, 1997.

BACKGROUND

The present invention relates generally to an interface between an operator and a machine. It relates more specifically to the field of such interfaces which present a signal to a human operator in contact with the interface. The invention relates most specifically to an interface that presents or exhibits a force signal to an operator, such as a human, or receives a force signal from such an operator. Because a force signal is by definition bi-directional, it can be said that the interface and the user "exchange" a force signal, or "share" it with each other.

Machines are ubiquitous in modern life, and every machine must be controlled, either directly or indirectly by a human operator. The interface through which the operator controls the machine and receives information from the machine should be as easy to use as possible, in light of the functionality the machine provides. Examples of such machines include slave robotic machines that operate in an environment different from that in which the operator exists. Other machines include machine tools for shaping materials, vehicles and powered machinery. Computers are also machines, which manipulate data representing, among other things, text (word processors); numbers (spread sheets); records (data bases); geometrical constructs (drawing and painting programs), etc.

The user may control and otherwise interact with such machines through various devices, such as a lever, joystick, mouse (having buttons and a tracking mechanism), exoskeleton, keyboard, touch screen, digitized pad or tablet, head mouse, etc. Typically, the user manipulates a "master" input device in the user's local environment and the "slave" robot, typically in a different environment, moves in accordance to the user's manipulations. The configuration of the master device may or may not conform to some degree to the conformation of the slave device.

For a rigid body, such as a rod-like appendage of a machine, the number of freedoms necessary to unambiguously specify its relation to a reference frame is typically considered to be six. Conceptually, three freedoms specify the location of a point on the rigid body, relative to the reference frame, and three additional freedoms specify the orientation of the rigid body relative to the same, or an equivalent reference frame.

Components on master devices typically are provided with numerous degrees of freedom of motion to permit varied motions by the user. The number of such degrees can be from one to six or more. These numerous freedoms are facilitated by numerous joints and actuators. Thus, a master arm may have a hand portion, with several fingers, each with several joints. The hand may be joined through a wrist joint to a forearm section, joined through an elbow joint to an upper arm section, joined through a shoulder joint to a trunk. Considering the joint of a finger most distant from the trunk, it's state relative to a reference frame can be specified by six freedoms, three for its position and three for its orientation.

However, the entire arm assembly may have many more than these six freedoms, due to the numerous joints and their various flexibilities. There may be several conformations of the other elements of the arm that place the terminal finger digit in the same state. Many, or all of the actuators that drive the arm may contribute to establishing the state of a single freedom, such as the location along one axis. Thus, the entire arm itself has many freedoms, more than six. However, only six freedoms of motion are required to specify the state of any rigid body portion of the arm.

Certain of such master and slave machine systems, known as force reflecting systems, provide actuators such that motions of the master component through the various degrees of freedom are affected or constrained to some extent. Typically, the motions are affected based on conditions in the environment of the slave robotic machine, such as forces that the slave encounters. Thus, the user, grasping or otherwise contacting the master machine, experiences constraints on the freedoms of motion that relate in some way to the slave environment, and thus, receives a force feedback signal. A teleoperator is such a device.

In certain instances, it is desirable for the user to feel the forces as if the user were contacting the slave environment directly, rather than remotely through the master to slave connection, including intervening stages. A system that accomplishes this is sometimes referred to as a "force reflecting" system. Such a force reflecting interface is also referred to as a "haptic" interface because it relates to the human system of touch. Typical design considerations for such an interface include the fidelity of the position and force or torque feedback, simplicity of structure, minimization of backlash, independence of freedoms of motion, work space conformation, stiffness, responsiveness, sensitivity, minimization of the physical bulkiness of apparatus and the bandwidth of its response. By bandwidth, it is meant, the range of combinations of speed of response and force applied.

In addition to controlling traditional, physical machines, it is known for human operators to control "virtual" machines and environments, which are not physical, but rather are "embodied" or reside in a computer model.

Simple examples abound in connection with common computer tasks. For instance, using a computer drawing or painting program, a user controls a group of virtual geometric objects that can be moved relative to one another, created, destroyed, altered, stretched, etc. Another example is the now familiar "desktop" metaphor for showing a directory of computer files, and for the user to provide instructions with respect to the manipulation (copying, deleting, opening, modifying, etc.) of those files. Within a word-processing program, the user manipulates virtual controls to scroll through different parts of the text of a document, to delete ("cut") certain sections and to add ("paste") them elsewhere. There are many more examples. Basically, such examples include anything where a user affects representations of data elements, as represented by the computer interface.

More complicated examples include those in which a more realistic environment is created, such as by using more sophisticated visual renditions of objects and settings, and projection devices such as helmets and special eyeglasses.

A user may interact with the virtual environment by means of various physical input devices, such as have been mentioned above. Sound may also be a part of the interface.

The virtual, or artificial environments may also recreate or simulate real environments, and can be used for the practice of skills, such as medical surgery, geological excavation, dangerous cargo manipulation, etc.

The various interactive systems may expand the abilities of humans, by increasing physical strength, improving manual dexterity, augmenting the senses, and by projecting human users into remote and abstract environments, either real or artificial. The remote environments can also be of a scale much larger or much smaller than typical human scales.

Force reflecting systems can be differentiated from other known simulations, such as graphical flight simulators, and remote controls, by the provision of force feedback. To enhance the user's perception of physical interaction with the slave environment, more than visual and auditory cues are required. Touch, is the only one of the five human senses that provides a two way interface with the environment. Using touch, a human can affect the environment while at the same time, perceiving the effect of the contact with the environment. Such direct feedback facilitates the user's perception of presence or influence in the slave environment. In effect, with touch, a force signal is exchanged or shared between the user and the machine, just an equal and opposite forces are shared by two people holding hands.

The purpose of the force reflecting master is to give a user the sense that the user is touching an object that is not actually in the local environment. The object, referred to below as a "non-local" object, can be a real object being manipulated by a physical slave machine, or it can be a representation in an environment that exists only as a computer data model.

For an ideal haptic interface, the user would not realize that he was touching an interface separate from the environment to be manipulated. Specifically, a user would not be able to distinguish between touching a real object and touching a virtual object with the device. Further, the device would not encumber the user. The ideal interface would exert no external force on the user when the user is moving freely in space.

Hard surfaces, such as walls, should feel as stiff with the device as they do in real life, even when contacted at high velocity. Corners of solid objects should feel crisp. Compliant surfaces should feel springy.

Some known attempts at constructing force reflecting interfaces have used an "exoskeleton." An exoskeleton is worn by the user and can often exert forces at several locations along the arms and/or fingers. See generally, B. A. Marcus, B. An, and B. Eberman, "EXOS Research on Master Controllers for Robotic Devices," FIFTH ANNUAL WORKSHOP ON SPACE OPERATIONS APPLICATIONS AND RESEARCH (SOAR '91) pp. 238–245, July 1991. There are many constraints in the design of an exoskeleton device, because the structure must attach to several locations on the human body and the exoskeleton joints must effectively be co-located with human joints. Counterbalancing such structures, and designing stiff, uncoupled transmissions for them is difficult. The structures must be counterbalanced so that the user does not perceive them as an artificial construct of the feedback system. The transmissions must be stiff so that there is a feeling of direct contact with the non-local environment.

Another type of force reflecting interface uses an externally grounded joystick. Typical of these devices are the traditional "hot-cell" manipulator systems and force reflecting hand controller.

Thus the several objects of the invention include, to enable human interaction with a non-local environment, either physical or computer represented, with a high degree of realism. It is an object to facilitate a high fidelity position and torque or force feedback, so that the user has an accurate perception of the conditions in the non-local environment. The user interface should be transparent to the user and as unobtrusive as possible. Implicit in this object is to minimize system backlash. It is further an object to provide such an interface that permits user action over a physically appropriate size of workspace, without necessitating a bulky or overly complicated apparatus. It is also an object to provide a device that responds quickly enough to conditions in the non-local environment for a realistic simulation, and which displays appropriate stiffness and sensitivity, as well as a relatively large response bandwidth, so that relatively quick motions can be perceived and imparted by the user. It is also an object of the invention to display discontinuous events, such as impact.

SUMMARY

In a preferred embodiment, the invention is an apparatus for physically exchanging a force with a user in an environment local to the user. The apparatus comprises a connection element for physically connecting to a user's body member and a linkage between the connection element and ground. The linkage includes means for powering at least three independent freedoms of the connection element relative to ground and means for maintaining at least one independent freedom of the connection element relative to said ground free of power. Up to three independent freedoms of the connection element may be maintained free of power, and up to five independent freedoms may be powered, although the number of powered and free freedoms of the connection element alone does not exceed six. The linkage may also include three linked bearings, with two pairs of the three bearings being orthogonal, such as a gimbal assembly. The axes of the bearings intersect at a reference point. For instance, the connection element can be a thimble, for insertion of a user's finger, with the intersection point being inside the user's finger, as connected to the thimble.

The linkage may also include at least two masses that are movable relative to ground and each other and the connection element, such that the center of mass among these items remains substantially stationary relative to ground despite motion of the connection element. The masses may constitute actuators, which may be connected to a local grounded element through a single cable transmission. Other user connection elements include a rod or stylus, or thimbles sized to accept other body members, such as the head, buttocks, foot, hand, arm, leg, tongue and toe.

It is also sometimes beneficial to track the motions of the freedoms that are unpowered. The ground may be a portion of the user's body other than that to which the connection element is connected.

In another preferred embodiment, the powered freedoms are tracked and a signal is generated based on the tracking of the freedoms. The signal is transmitted to a non-local environment. The non-local environment may be a physical environment or a virtual, computer resident environment.

In yet another preferred embodiment, the invention is an apparatus for physically exchanging a force with a user in a first environment that is local to the user. The apparatus comprises a user connection element and a linkage for connecting the element to ground. The linkage includes pair of quarter gimbals with the connection element fixed to a rotational bearing fixed to one end of one of the quarter gimbals. The free end of the other quarter gimbal is connected to an extension of one bar of a five bar linkage. The five bar linkage is actuated by two actuators, each connected between a different one of the bars of the linkage and a support that is more proximal to ground than the actuators. The support is actuated with respect to ground by a third actuator. The three actuators combine to power three freedoms of the connection element. The gimbals combine to maintain three freedoms of the connection element free of power.

Still another embodiment of the invention is an apparatus for generating a signal at a specified point. The apparatus comprises a pair of actuators that are both connected to ground through the same cable. A linkage is also provided for kinematically connecting both of the actuators to the specified point. The actuators may both be connected between ground and the specified point through a five bar linkage.

Another embodiment of the invention is an apparatus for generating a signal representative of a force, in effect, a virtual switch. The apparatus comprises a receiver for receiving a signal representative of the location of a user reference point relative to a user reference frame and a model for storing a representation of: a non-local reference frame; the user reference frame, relative to said non-local reference frame; and the conformation of a, non-local environment comprising a switch-type, spring-type element, relative to said non-local reference frame. A comparator is provided for comparing the location of the user reference point relative to the non-local environment. A force generator is provided for generating a signal representative of a force. The force signal is based on the location of the user reference point relative to the non-local environment and a set of force rules. The force rules include spring-force rules which specify a switch output force signal in response to a location signal of the user reference point indicative of a deflected conformation of the spring-type element. The switch output force signal is specified by a non-linear function. Thus, a realistic virtual switch is provided. The invention may also include an operator that makes changes to the representation of the non-local environment based on the signal representative of force and the set of force rules. For instance, the representation of the switch changes location in the non-local environment.

Another preferred embodiment of the invention is a similar apparatus for generating a signal representative of a force, where the non-local environment comprises a type of element which changes its cross sectional area in response to a force in a direction perpendicular to the plane of the area. Such an element is defined as a "diagonal" type element. Such elements include a bristle brush, or a sponge. With such an embodiment, which is similar to the virtual switch embodiment, the force rules include a spring-force rule that specifies a diagonal element output force signal in response to a location signal of the user reference point indicative of a deflected conformation of the diagonal-type element. This simulates the feeling that a user has when pushing against a deforming bristle head of a brush. The operator for calculating changes to the non-local environment based on the force signal specifies a change in the representation of the cross-sectional area of a selected region of said diagonal-type element. The non-local environment may also include an indicia of the cross-sectional area of the selected region of said diagonal-type element, analogous to the mark a paint filled brush makes when pressed onto a painting substrate. The apparatus may also include means for storing this indicia over time, thus storing a painted line of widths that vary along its length, based on the force applied by a user. The non-local environment may also include a plurality of such force rules, analogous to different sizes and stiffnesses and shapes of brushes.

In another preferred embodiment of the invention, the force generator can generate forces based on the time history of the location of the user reference point relative to the non-local environment. The force rules include friction-type rules which specify a friction output force signal in response to the time history of the location signal of the user reference point indicative of a change in position over time of the user reference point.

Another preferred embodiment of the invention is similar to the previous embodiment. The non-local environment includes a representation of a drafting substrate over which the reference point moves. The force rules, rather than specifying rules for the moving reference point, specify force generating rules for a substrate. A force generator is provided for generating a signal representative of a force, based on the location of the user reference point relative to the non-local environment and a set of force rules. The rules include drafting substrate-force rules, which specify a drafting substrate output force signal in response to a location signal of the user reference point indicative of a deflected conformation of the drafting substrate-type element. The apparatus may also include a non-local environment reaction calculator that makes changes to the representation of the conformation of the non-local environment based on the signal representative of force and the set of force rules. The drafting substrate type-element rule specifies a change in the representation of a surface shape of a selected region of the drafting substrate-type element. The surface texture of the substrate may be included in the non-local environment, and may be modeled as a rippled wall.

Another preferred embodiment of the invention is A method for physically exchanging a force between an apparatus and a user in a first, user-local environment, said method comprising the steps of providing an apparatus as described above, having a connection element for physically connecting to a body member of a user and a linkage between the connection element and ground. The linkage comprises means for powering at least three independent freedoms of the connection element relative to ground and means for maintaining at least one independent freedom of the connection element relative to ground free of power. The method also includes the steps of connecting the connection element to a body member of the user and powering the at least three independent freedoms of the connection element.

Another preferred embodiment of the invention is method for generating a signal representative of force, such as for a virtual paint brush. The method comprises the steps of receiving a signal representative of the location of a user reference point relative to a user reference frame. Another step is storing a representation of: a non-local reference frame; the user reference frame, relative to the non-local reference frame; and the conformation of a, non-local environment comprising a diagonal-type, spring-type element, relative to the non-local reference frame. The location of the user reference point is taken relative to the non-local environment. A signal is generated representative of a force, based on the location of the user reference point relative to the non-local environment and a set of force rules. The force rules include spring-force rules which specify a diagonal element output force signal in response to a location signal of the user reference point indicative of a deflected conformation of the diagonal-type element. The representation of the conformation of the non-local environment is changed based on the signal representative of force and the set of force rules. The diagonal element spring-type rule specifies a change in the representation of the cross-sectional area of a selected region of the diagonal-type element.

BRIEF DESCRIPTION OF THE DRAWINGS

These and other features, aspects, and advantages of the present invention will become better understood with regard to the following description, appended claims and accompanying drawings, where:

DETAILED DESCRIPTION

Figure 1:
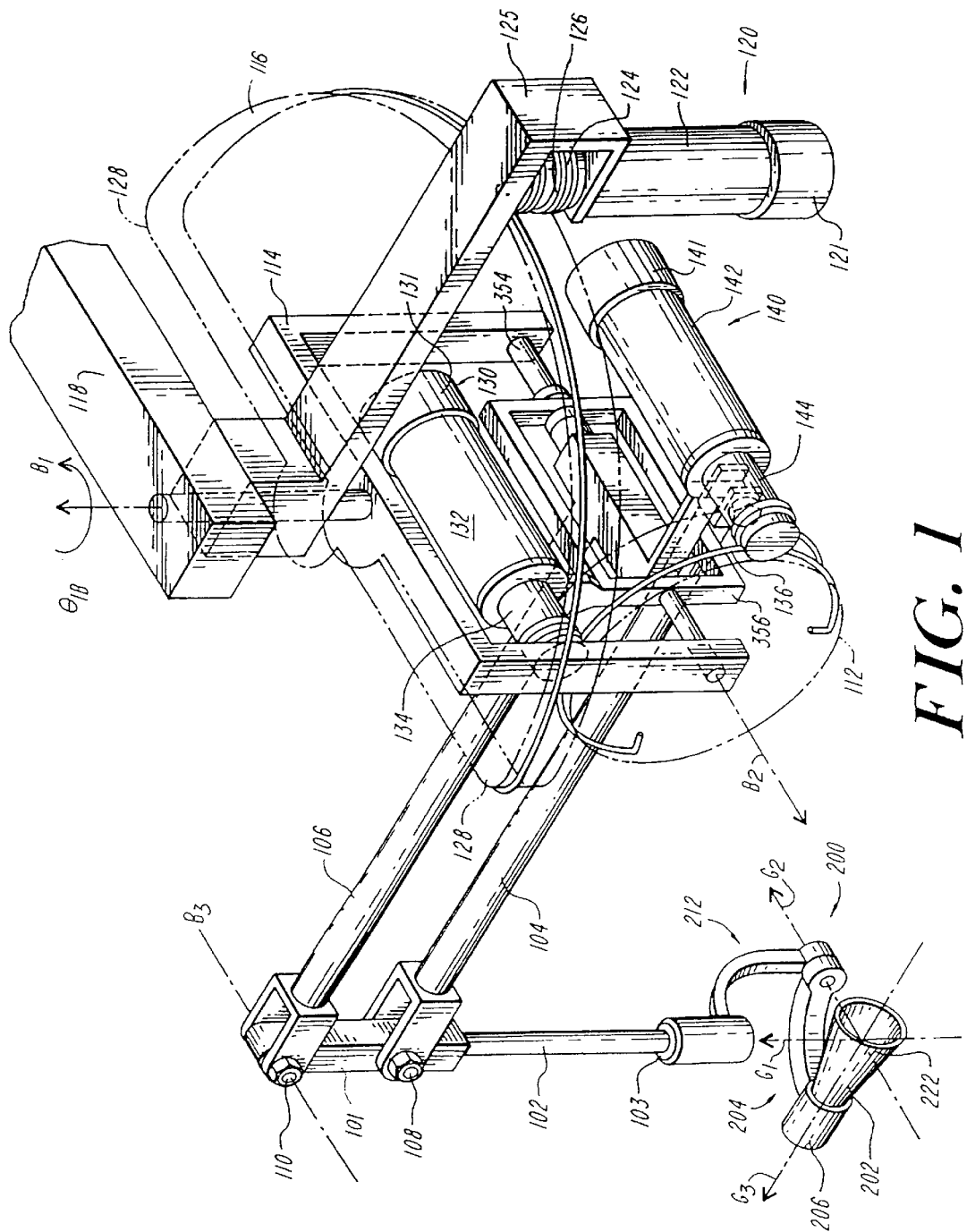
FIG. 1 is a schematic perspective representation of a portion of a preferred embodiment of the invention, showing three actuators and a linkage for providing an apparatus having three powered and tracked freedoms of motion. The device also includes a user contact assembly having three free freedoms of motion.

The present invention includes an apparatus that can be used to interact with a "non-local" environment, either real or virtual. The virtual environment can be of a typical computer data processing type, or of a less common, more specialized type.

In one embodiment, a thimble is provided for engaging a user's finger. The thimble is supported through a linkage such that three freedoms of motion are provided for the user's finger that are totally "unpowered." By unpowered, ort "free of power", it is meant that they are not powered, nor is there any resistance (e.g. friction or damping) to motion through these freedoms. (The status or position of motion through these unpowered freedoms may or may not be tracked. If they are not tracked, they are referred to herein as "free.") In the same embodiment, the linkage is arranged such that three additional freedoms of motion are "powered." By powered, it is meant that the device has the capability to resist or assist motion through these freedoms, depending on the conditions in the non-local environment and, typically, tracks the user's motions with respect to these three freedoms. It is possible although typically not desirable to have a powered, but untracked freedom. Therefore, that embodiment is not discussed.

In this specification, and in the claims, "non-local environment" signifies an environment other than that in which the user resides. The non-local environment may be a virtual, computer generated or resident environment, or it may be the environment of a slave machine. It may be, substantially "local" in the conventional sense, for instance, a doctor may manipulate a slave mechanism that is inside a patient's body in the same room as the doctor. However, the doctor manipulates a master device, rather than the slave device, which moves by virtue of connections between the master and the slave devices. In this context, the environment inside the patient's body is the non-local environment, despite its physical proximity to the surgeon.

The invention may also be used with two (or more) human operators, each engaging a different physical interface. Each operator's interface is controlled by the invention to generate forces and motions in response to the forces and motions conducted by the operator in the environment of the other operator(s) in question, as well as tracking the motions and forces conducted by the operator in the environment that is local relative to the interface. Thus, two human operators can be in "virtual" contact with each other, each interface functioning as both a conventional "slave" and a "master."

Another use for the phrase "non-local environment" is a wholly computer generated environment that is representative of data. The data can itself represent a physical situation, although it need not. For instance, data reflecting a numerical index that rises and falls, such as the average temperature for each day, may be represented as a line graph. The non-local environment is a rising and falling graph of the data. This rising and falling graph can be "felt" and "examined" by a user, just as other virtual objects represented in computer memory can be felt.

Figure 2A:
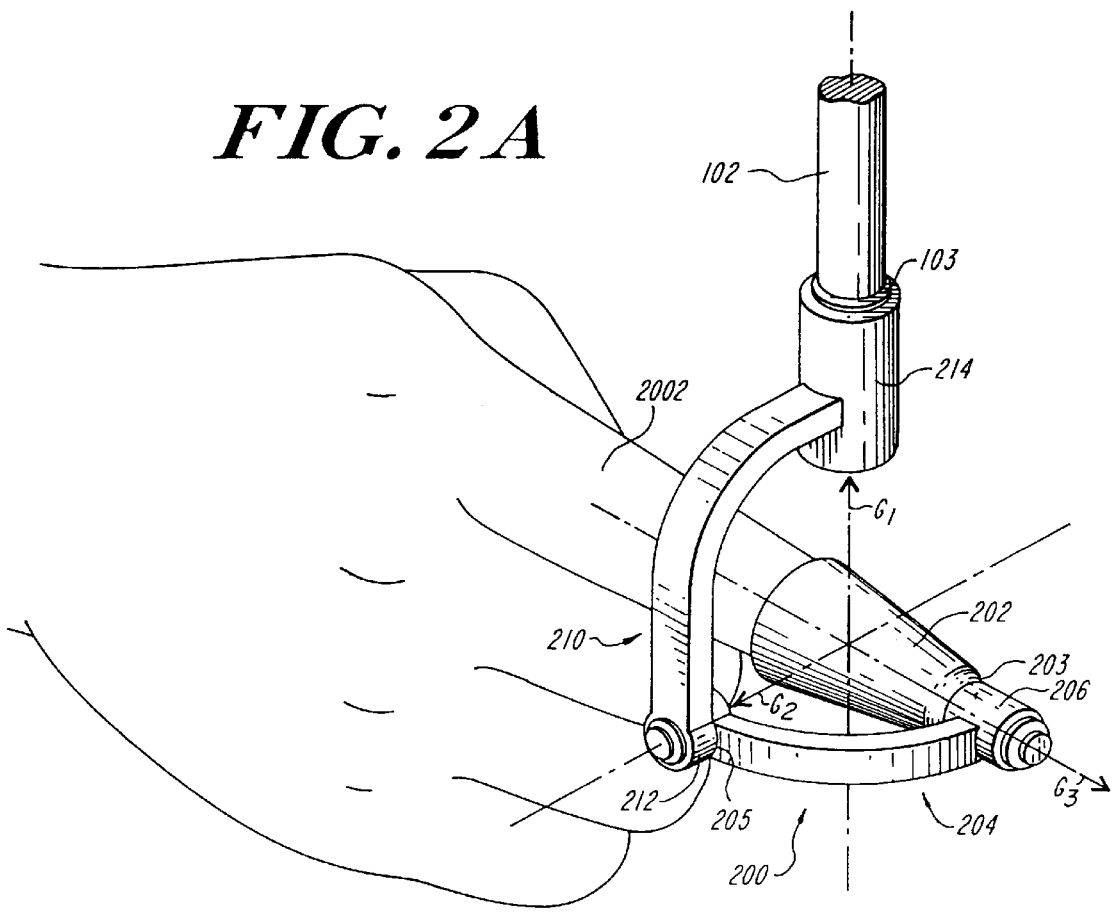
FIG. 2A is a schematic perspective representation of a portion of a preferred embodiment of the invention, showing a three free degree of freedom gimbal and thimble being contacted by a user's finger.

As shown in FIG. 1, a user connection element 200 is mounted at the end of a link 102. The user connection 200 is a gimbal assembly that is free to rotate about the axis $G_1$ defined by an extension of the link 102, being mounted thereon through a suitably frictionless bearing 103. The gimbal 200 is shown in more detail in FIG. 2A.

A thimble 202 is supported by an end quarter-gimbal 204 so that it can spin around an axis $G_3$, which passes through one barrel 206 of the end gimbal 204. The bearing 203, through which the thimble 202 is mounted, is substantially frictionless. The quarter-gimbal 204 is itself connected through a frictionless bearing 205 to the barrel portion 212 of another, medial quarter gimbal 210. The end gimbal 204 is free to rotate about axis $G_2$, which passes through the barrel portion 212, and which intersects with axis $G_3$ in the vicinity of the thimble 202. The entire gimbal assembly 200, made up of the medial quarter gimbal 210 and the end quarter gimbal 204 and the thimble 202 is free to rotate about axis $G_1$, which passes through the barrel portion 214 of the medial quarter gimbal 210. The axis $G_1$ substantially intersects with the other two axes $G_2$ and $G_3$ at a user reference point 222.

Thus, if a user inserts a finger 2002 into the thimble 202, the user can rotate the finger about its long dimension, i.e. about axis $G_3$. The user can also swing the base of the finger about axis $G_1$, thus moving through a plane spanning between the thumb and small finger of an outspread hand, with the palm facing downward. Similarly the user can swing the base of the finger about axis $G_2$, through a plane spanning between the palm and the back of the hand. These freedoms of motion can be considered to describe the orientation of the user's finger 2002 with respect to an independent reference frame, or a "ground."

An aspect of the invention is the realization that, for many interactions of a user's fingertip and the real world, the environment does not resist motions through these orientation related freedoms defined above. Further, the finger's position with respect to these freedoms is irrelevant to the user's perception of the environment, and for the environment's reaction to the user's finger activities. Essentially, the finger interacts with the world at a point. Thus, it is not necessary to provide apparatus to actively power these freedoms, or, in some cases, to track the user's motions through or position with respect to these freedoms. This aspect of the invention is explained more fully below, after a brief discussion of the apparatus characterized by some powered freedoms of motion and some unpowered freedoms, in a typical embodiment.

The observation extends to interactions between all other of a user's body members, including but not limited to the foot, arm, tongue, head, buttocks, etc., and combinations of powered and unpowered freedoms other than three powered and three unpowered. In addition to interfacing with a computer using a body member, a user may also have need to use an orifice, including the mouth, for instance in situations of lower limb paralysis. The observation also extends to the interaction between some point type tools (pencil, stylus, scalpel, etc.) and their environments as well as line-type tools (e.g. rat tail file, sword and cane).

As shown in FIG. 1, the user connection gimbal 200 is supported freely rotationally upon link 102, which is hinged to a pair of parallel links 106 and 104. The hinges 108 and 110, joining the link 102 to the parallel links 104 and 106, respectively, are as frictionless as possible. The two links 104 and 106 are connected to a disk 112 through a mechanism that is shown partially in phantom in FIG. 1 and is explained in more detail below.

The disk 112 is supported through a frame 114 from a base 116, which itself is supported by a grounded support 118. The base 116 and frame 114 are fixed to each other so that they rotate together through angle $\theta^{1B}$, about axis $B_1$. A bearing is provided to rotatably support both, but is not visible in FIG. 1. This bearing is also as frictionless as possible.

The ground, which is not shown, is the item which serves as a frame of reference, relative to which all motions and positions of the user connection element is measured. In the embodiment shown, the connection element is the thimble 202. In many applications, the ground is fixed relative to the earth, or the user's local environment. Thus, it may be fixed to the floor, or a wall, or furniture. However, this is not required. Another portion of the user may, in fact be the ground. For instance, the user's head, or hips, or chest may serve as the ground. The ground may itself be observably "floating," such as a buoy in a body of water, or other fluid, a floating balloon, or a moving vehicle. What is important is that the ground is the reference frame with respect to which motion and position of the connection element is measured.

Figure 3:
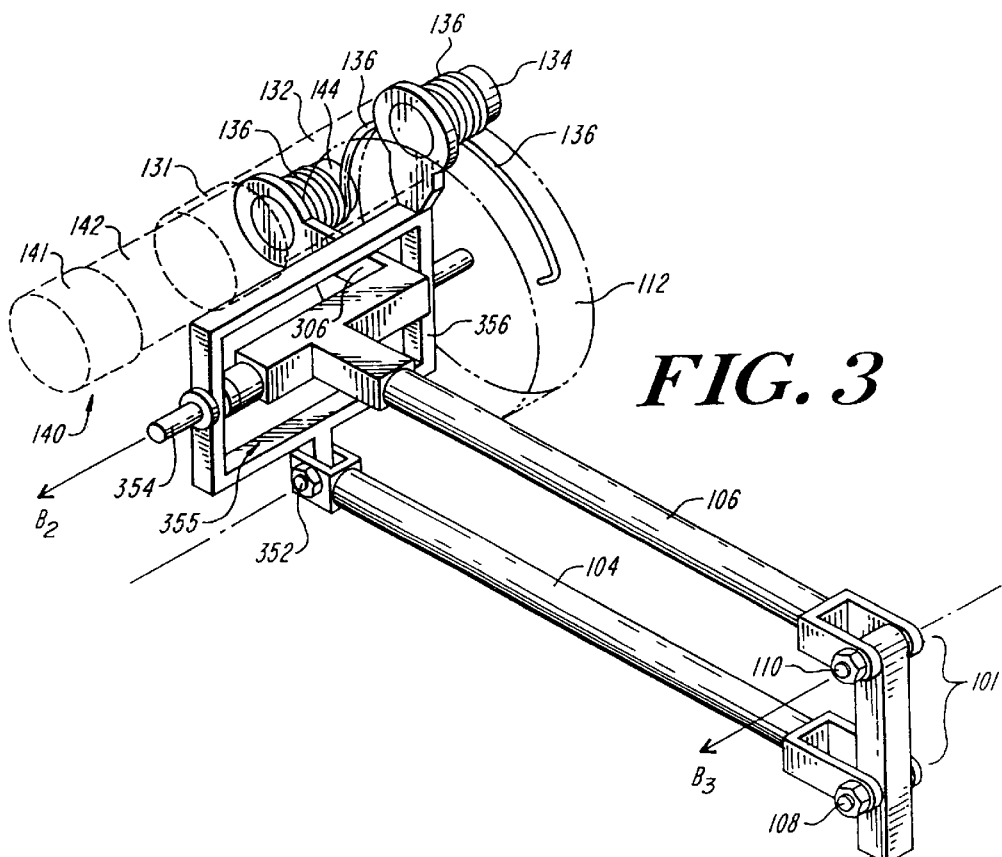
FIG. 3 is a perspective representation of the embodiment of the invention shown in FIG. 1, with one actuator removed, shown from the reverse side.

The connection to the grounded support 118 through the frame 114 and the base 116 permits motion of the gimbal user connection assembly 200 around the axis $B_1$. Because the joints 108 and 110 are hinged, it is also possible to move the gimbal assembly 200 in a straight line, rather than along an arc, for instance in a straight line parallel to axis y as shown in FIG. 3.

No constraint or control or power assist has been mentioned regarding motion of the base 116 around the axis $B_1$. However, in a preferred embodiment, an actuator 120 is provided, which can actively control motion around this axis. ("Actuator" is used in this specification to refer to a unit that is either a motor, or otherwise exerts a force. The actuator is often equipped with an encoder also, although, it need not be.) Briefly, the actuator 120 has a body portion 122 and an axle (not shown) upon which is mounted a capstan 124. If current is provided to the actuator (through wires not shown), the capstan spins on the axis relative to the body portion 122. The body portion is rotationally fixed by a support 125, which is fixed to the grounded support 118, so the capstan 124 rotates relative to ground and the body portion remains fixed. A cable 126 is wrapped around the capstan and is anchored at either end 128 to the base 116. The cable is routed such that when the capstan 124 rotates, it pulls the cable 126 around it, thus causing the base 116 to rotate. Consequently, the frame 114 and the entire assembly described above also rotate about axis $B_1$. Thus, a torque can be applied to the base 116.

Figure 4:
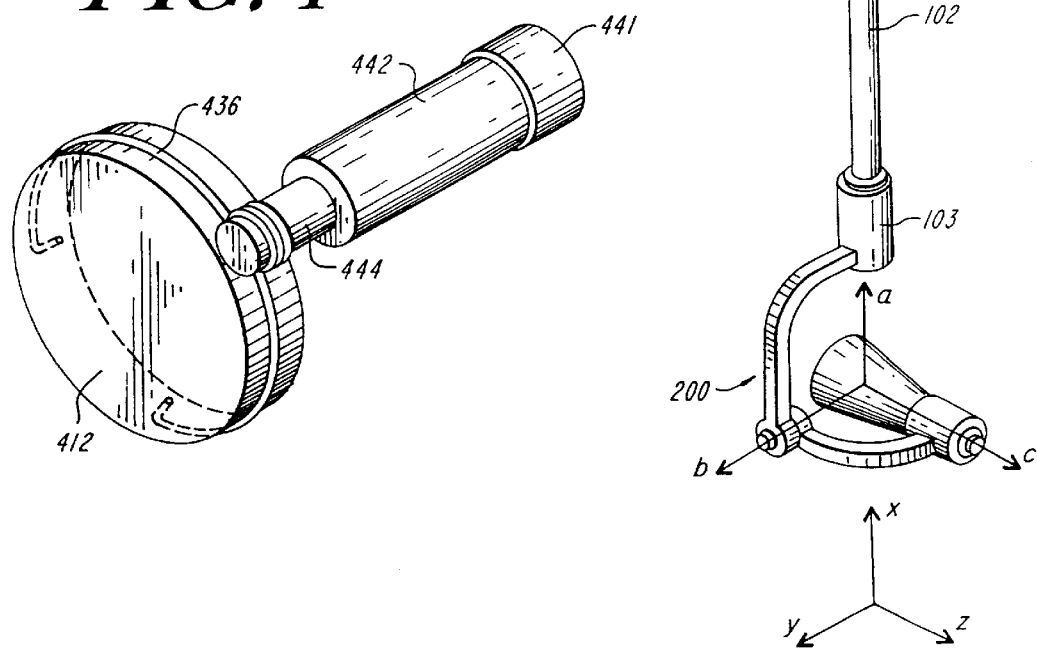
FIG. 4 is a schematic perspective view of an actuator connected through a capstan and a cable to a disk.

FIG. 4 shows in detail a single actuator having an encoder 441, a body portion 442 and a capstan 444, connected to a disk 412 through a cable 436. The function of the actuator and disk 412 is similar in principle to the function of the actuator 140 and its respective disk 112 as shown in FIG. 1.

The actuator 120 may also provide a position sensing capability. In a typical case, the actuator 120 includes a conventional position encoder 121 that keeps track of the relative rotary position between the capstan 124 and the body portion 122. Thus, given the appropriate geometrical analysis, the position of the base 116 about the axis $B_1$ can be determined and a signal representative thereof can be generated by the encoder. Rather than an encoder, any suitable position transducer may be used, such as a potentiometer, a resolver, a hall effect sensor, etc.

As will be described in more detail below, an additional actuator 140 is arranged to exert torque on the link 106 around an axis $B_2$ that passes through the center of the disk 112. The body 142 and capstan 144 of the additional actuator 140 is connected through a cable 136 to the disk 112 and also includes an encoder, not shown, to keep track of the position of the actuator about the axis $B_2$.

Further, a third actuator 130 is also connected to the disk 112 through the same cable 136 and is arranged to exert torque on the link 356 around the axis $B_2$. The actuator 130 also includes an encoder 131 to keep track of the rotational position of another hinge joint (352, FIG. 3, 10A, not shown in FIG. 1) with respect to the axis $B_2$. Because of the geometry of the links 106, 104, 356 and the portion 101 of the link 102 that is between the hinge joints 110 and 108, keeping track of this position of the hinge joint 352 relative to the axis $B_2$ is equivalent to keeping track of the position of the hinge joint 108 with respect to the axis $B_3$. This is because the distance between the two hinge joints 110 and 108 is known, and, in this case is equal to the distance between the hinge joint 352 and the axis $B_2$, and because the arrangement of the links 104 and 106 is known, in this case, remaining parallel, as are the links 356 and the portion 101 of link 102.

Although in the embodiment shown, the links 106 and 104 are parallel, they need not be. Similarly, the links 101 and 356 need not be parallel or of the same length. All that is required is that their relative lengths be known. Hinges are provided between links 104 and 102, 102 and 106 and 106 and 356. The links 106 and 356 both rotate around an axle bar 354, which is connected to ground by being connected to the disk 112 and the frame 114, which is connected to the grounded support 118. Moving any one link constrains the motion of the other four. However, the motions of the links would not be constrained with respect to ground, but for the axle 354. Thus, the linkage is a five bar linkage. Alternatively, the axle 354 can be fixed to one of either links 106 or 356 and can be connected to the disk 112 through a rotary bearing.

Knowing the relative positions of the hinges, and the geometry of the device, it is possible to precisely specify the location with respect to ground of the user reference point 222 within the tip of the thimble 202 at which the axes $G_1$, $G_2$, and $G_3$ intersect. Thus, the device can determine the location of the user's finger tip.

Figure 10A:
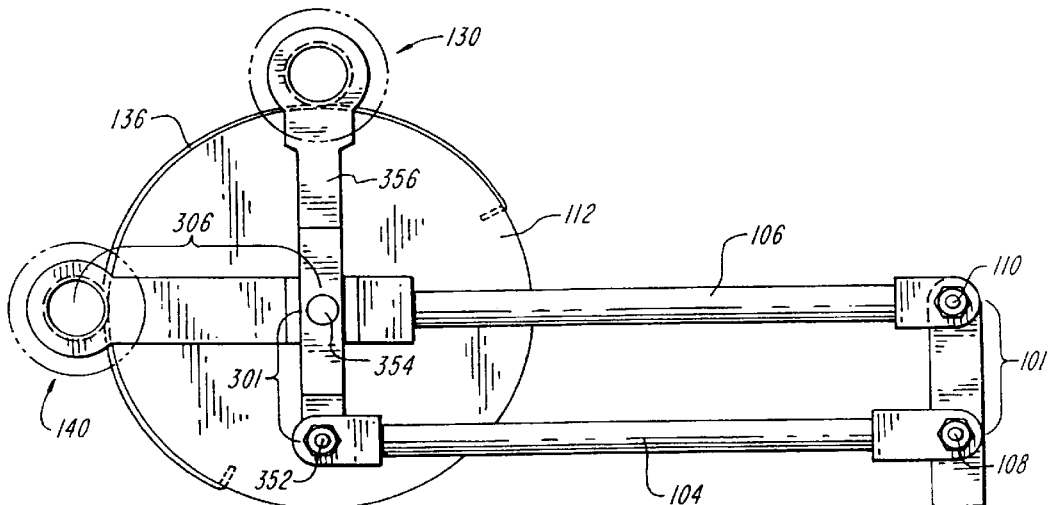
FIG. 10A is a schematic side elevation representation of the embodiment of the invention shown in FIGS. 1 and 3 with the user connection assembly and the actuators at nominal home positions.
Figure 10A:
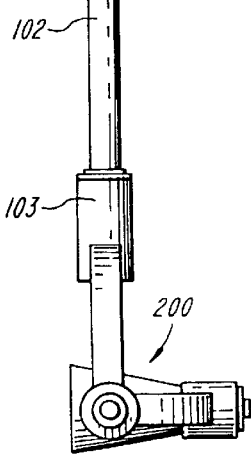

As can be seen in FIGS. 1, 3, and 10A, the actuators 130 and 140 are both connected to the disk 112 through a single cable 136. The disk 112 is mounted through the frame 114, such that it cannot rotate about the axis $B_2$. Each actuator 130 and 140 is mounted to a respective link 356, 106, such that the body portion of the actuator cannot rotate relative to the link. If current is provided to the actuator (through wires not shown), a relative rotation is induced between the body portion and the respective capstan, for instance the body portion 132 and capstan 134. The cable 136 is wrapped around the capstan and anchored to the disk 112 at both ends such that when the capstan rotates, it pulls the actuator around the disk, toward one or the other of the cable endpoints. This differs from the normal use of actuators and transmission elements, where the actuator remains stationary and the transmission element moves relative to ground. The tension of the cable 136 is provided so that the actuator moves in either directions without slipping or binding. The figure eight wrapping configuration of the cable (around the capstan and the disk 112) allows for higher tension with lower friction than a conventional simple loop configuration. The cable could also be terminated on the capstans.

Considering first the actuator 130, it is connected to a relatively short arm 356 which is part of a box frame 355 that pivots around the axle 354 that passes through the center of the disk 112 along the axis $B_2$. The short link 356 extends beyond the center, to a hinged joint 352, at which the link 356 is hinged to the longer link 104. The link 356 includes a portion 301, which extends from the axle 354 to the hinged joint 352. The link 104 is connected to the link 102 from which the gimbal user connection assembly 200 is suspended.

Figure 10B:
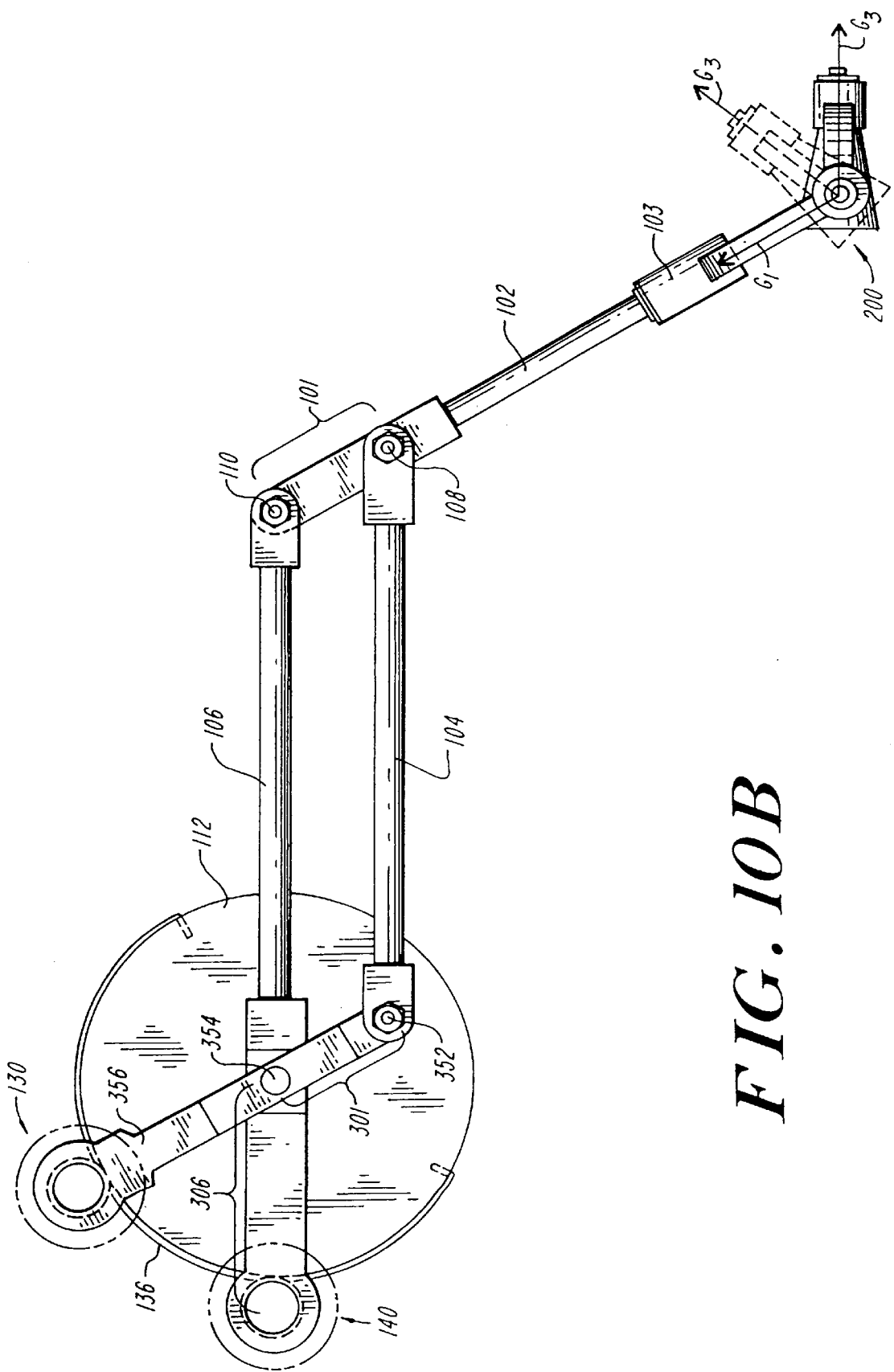
FIG. 10B is a schematic side elevation representation of the embodiment of the invention shown in FIGS. 1 and 3 in a position where one of the actuators remains at the home position and the other is moved from it.

Thus, with the four links 301, 101, 106 and 104 arranged in a nominal "home" position, to form a rectangle, (as shown in FIG. 10A) if the user moves the user connection assembly 200 generally perpendicular to the long axis of link 102 in such a way that the hinge 108 moves in an arc around the hinge 110 and the hinge 352 moves in an arc around the axle 354 so that the assembly is in the configuration shown in FIG. 10B, the short arm 356 will pivot around the axle 354, and cause the actuator 130 to travel along the cable toward the other actuator 140. The motion of the actuator 130 results in a relative rotation between the capstan 134 and the housing 132, from which the position of the actuator 130 relative to the axis $B_2$ can be determined. From the position of the actuator 130, an aspect of the position of the user reference point 222 can be determined.

If a current is applied to the actuator 130 and any torque that is applied by the user is insufficient to resist it, the actuator will move. Motion of the actuator 130 around the perimeter of the disk 112 causes motion of the short arm 356 and of the end of the link 104 that is hinged at 352 to the short link 356, and, consequently, the other end that is hinged to the link 102. Similarly, such motion causes a corresponding motion in the user connection gimbal assembly 200.

The actuator 140 operates similarly. It is also connected to the disk 112 through the same cable 136 by which the actuator 130 is connected. The actuator 140 is mounted to one end of the link 106, which pivots around the axle 354 (axis $B_2$) at the center of the disk 112. (The link 106 extends beyond the axle 354 to the actuator 140 by virtue of an "L" shaped link extension portion 306.) The link 106 is also connected through the hinge 110 to the end of the link 102, to which the gimbal assembly 200 is connected. Thus, motion of the user contact connection assembly 200 from the nominal "home" position, shown in FIG. 10A, in a direction generally parallel to the long dimension of the shaft 102 (to the position shown in FIG. 10C), results in a motion of the hinge 110 of the link 106 generally in an arc around the axle 354. This results in the actuator 140 being drawn around the perimeter of the disk 112, away from the actuator 130. The encoder 141 of the actuator 140 can thus determine its position around the axis $B_2$. From this position, an aspect of the position of the user reference point 222 can be determined.

Figure 10C:
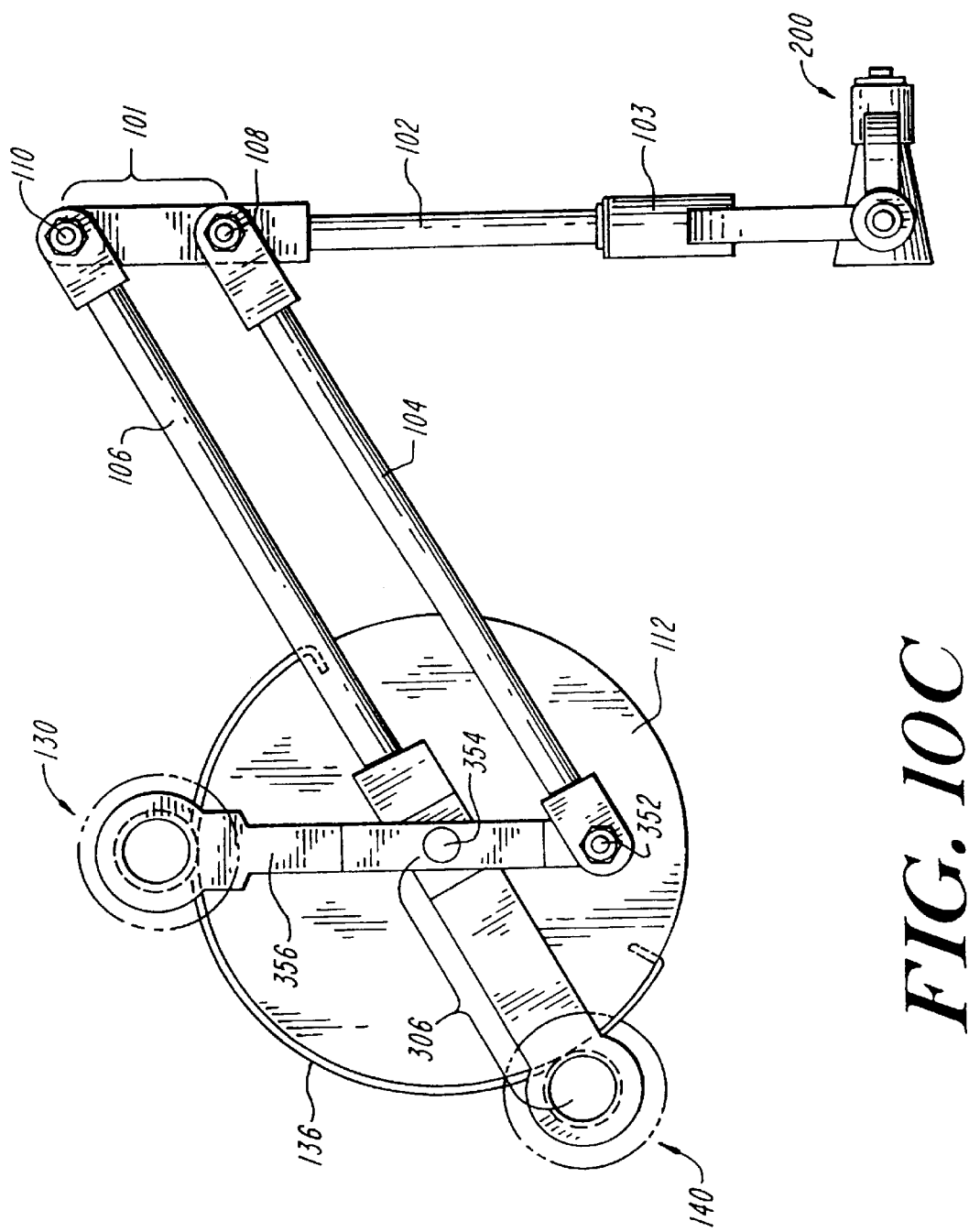
FIG. 10C is a schematic side elevation representation of the embodiment of the invention shown in FIGS. 1 and 3 in a position where the other of the two actuators remains at the home position and the actuator at home position in FIG. 10B is moved from it.

Similarly, if current is applied to the actuator 140, the actuator will be urged to travel around the perimeter of the disk 112, resulting in the motion of the gimbal assembly 200 from the home position to that shown in FIG. 10C.

Thus, it will be understood that, taking together the position signals generated by each of the encoders 131, 141 and 151, connected to the actuators 130, 140 and 120, in combination with the known geometry of the various links, the precise position relative to the ground can be determined of the user reference point 222 within the thimble where the axes $G_1$, $G_2$ and $G_3$ intersect. This location can be used by other parts of a system. For instance, it can be used to determine the location of a mapping of the user's fingertip relative to a virtual environment in a computer. It could also be used to determine the user's intention as to where to move a slave device located in a non-local environment relative to locations in that non-local environment.

The embodiment discussed above employs linkages that result in three powered, tracked freedoms of motion and three free (unpowered and untracked) freedoms of motion for the user's finger tip. As mentioned above, by a powered freedom of motion, it is meant that the mechanism can provide a resistance (or assistance) to the user's attempts to exercise that freedom of motion. In the embodiment illustrated, the powered freedoms are also "tracked," meaning that the mechanism can also keep track of the user's position with respect to that freedom. A powered freedom can be either tracked or untracked, although it is typically not beneficial to have an untracked, powered freedom. A tracked freedom can be either powered or unpowered. In the illustrated example, the powered freedoms are governed by the three actuators 120, 130 and 140, which include both motors and encoders. Considering a stationary reference frame as the ground, the three powered freedoms can be considered to relate to the position of the user's fingertip in a three dimensional space, as indicated by the axes x, y and z in FIG. 3.

It should be noted that none of the three actuators, 120, 130 or 140 can individually power motion through any arbitrary combination of the powered freedoms of translation relative to the axes x, y and z. Rather, all act together to both power and track such motion. Similarly, none of the three actuators can individually provide a torque that establishes an arbitrary force vector with respect to these three axes. Again, all act together to establish such a force.

Figure 2B:
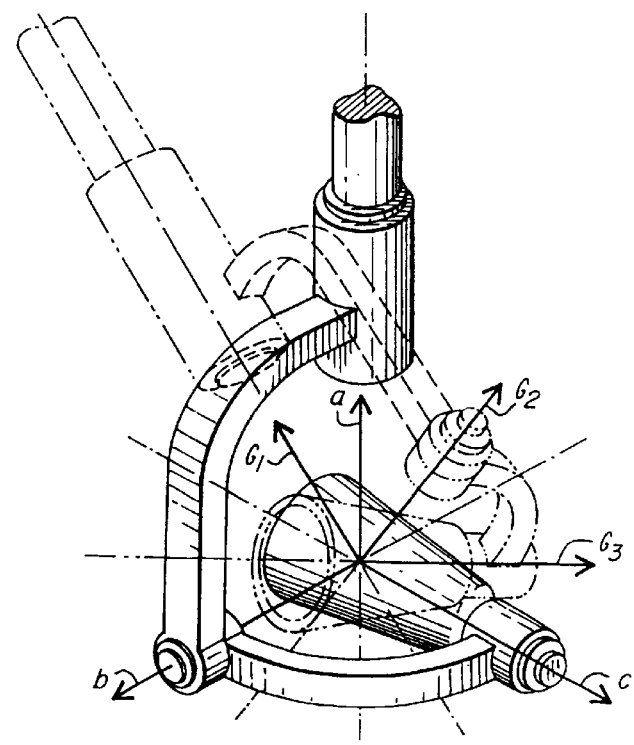
FIG. 2B is a schematic perspective representation of a portion of a preferred embodiment of the invention, showing axes by which the rotational aspect of the user connection element can be measured.

The free freedoms in this example can be considered to define the rotational position of the thimble, with respect to the stationary reference frame. The rotational position is measured with respect to the x, y, z frame translated to the reference point 222, at which the axes $G_1$, $G_2$ and $G_3$ coincide. This translated reference frame is represented in FIG. 2B by the axes a, b and c. Such a rotational position is measured relative to a rotational rest position, for instance one in which the axes $G_1$, $G_2$ and $G_3$ coincide with the axes a, b and c, respectively.

There is a difference between these three axes a, b and c and the axes $G_1$, $G_2$ and $G_3$. The G axes are fixed to the apparatus, and change their orientation depending on the relative location of the gimbal elements. For instance, if the user swivels the thimble such that its tip is pointing straight at the link 102, then the axes $G_1$ and $G_3$ would coincide. However, the axes a, b and c always remain orthogonal, and at the same orientation with respect to the reference frame having an origin at the origin of the axes x, y and z. The origin of the axes a, b and c moves with the translation of the reference point 222 at which the three G axes intersect.

The free freedoms of motion, in this example, are the rotations of the thimble about the axes a, b and c. They are facilitated through: the free spinning of the medial quarter gimbal 212 about the axis $G_1$; the free spinning of the end quarter gimbal 204 about the axis $G_2$; and the free rotation of the thimble 202 about axis $G_3$. These freedoms correspond to a combination of swinging the finger from left to right, and from palm to back of hand, and rotation of the finger about its long axis. None of these freedoms can be impeded or aided by the embodiment of the system shown in FIG. 1. In the embodiment shown, none of these freedoms are tracked or powered. Thus, the user's motions through these freedoms are not sensed or recorded or communicated to the non-local environment in any way. Nor does that environment act upon them.

A principal aspect of the invention is the realization that significant advantages can be achieved by limiting the number of powered (and in some cases, tracked) freedoms to less than the maximum number that are physically achievable. For instance, it would be technically possible to provide motors and encoders for each of the joints of the gimbal assembly, as well as the rotating thimble, thus providing six powered freedoms for the thimble. However, such an arrangement has drawbacks. Further, it is not necessary to provide so many powered freedoms to provide an apparatus that provides high fidelity force feedback for many useful applications, particularly point-type and line-type applications.

For instance, considering interactions between a user's finger tip and the physical world, most such interactions can be considered to be point-type interactions, where the real world does not apply a torque to the finger, but merely applies a force vector at a single point. In other words, there are many interactions where a user's finger is not twisted about its long axis. Similarly, there are many interactions where only a negligible torque is applied about two orthogonal axes that are perpendicular to the finger's long axis. Further, since a finger is fixed at one end, it cannot rotate freely about its center about either of these two axes. Any limited torque applied about these two axes can be faithfully modeled as a force, directed either along a line from palm to back of the hand, or from thumb to small finger or a combination thereof. The foregoing considerations apply to such activities as pushing a button, pulling a loop, pushing an object, probing, picking up objects between thumb and finger(s), tapping and scratching, just to name several.

Similarly, for such point-type interactions, the translational position of the fingertip is important, but the rotational status of the finger is irrelevant. If a user presses a simple button, the button will depress in the same manner whether the user contacts the button with the fleshy portion of the finger tip, or with the fingernail portion of the finger (ignoring considerations of friction). Similarly, the button will depress in the same manner no matter what the finger's angular position to the button from left to right (thumb to small finger) or up and down (back of the hand to the palm).

Thus, it is not necessary that the system be able to influence such freedoms of the user's finger and the user connection element 202, because a physical environment often does not influence such freedoms. Similarly, it is not necessary for the system to track the positions relative to such freedoms, because the physical world will react the same to user activities regardless of the positions relative to those freedoms. However, it is important that the user be able to pass through such freedoms, as is provided with the essentially frictionless joints and gimbals of the connection assembly 200.

To date, most known systems have either tried to provide powered and tracked control for all freedoms that are experienced (typically six for a rigid body), or have limited the number of freedoms available, for instance by prohibiting rotation about one axis.

Providing powered, tracked control over the maximum number of freedoms requires a large number of actuators. The actuators are relatively heavy and usually expensive. Controlling them requires additional computational power and programming. Additional transmissions are required to communicate with the additional actuators. Their weight must be counterbalanced, or otherwise accounted for so that the user does not perceive their existence. This further adds to the complication and bulk of the device. It also limits its ability to respond quickly to motions of the user, thus resulting in a narrower bandwidth than is desired.

There is another advantage to powering only three freedoms, and to using an arrangement such as shown in FIG. 1, where the user reference point falls within the user's body member connected to the device, in this case, a finger in a thimble. This arrangement allows the user to perceive sharp and small objects. The user's haptic resolution is enhanced, because the device acts as if the point of contact is within the user's body member. The effect is analogous to the enhanced haptic resolution achieved by removing a bulky glove and contacting an object with skin surface, except that in this case, the haptic resolution is enhanced by making it seem as if the user's muscles and bone are directly exchanging the force, rather than the force being mediated through the skin and intervening flesh.

Having described a preferred embodiment of the invention, the general properties that it embodies will be explained. These general properties may be achieved in a multitude of configurations, all of which are within the contemplation of the appended claims.

The actuators must be sized so that they can create forces that simulate the type of non-local environment sought to be replicated. The device should be able to exert a force large enough so that the user can experience the stiffness of a surface without saturating the actuators. This insures that the user will perceive a wall as immovable. A high maximum force will also enable the device to display impact force transients more accurately (as when a slave device strikes a wall). The maximum force that the device can exert should also be viewed in relation to the back drive friction inherent in the device (discussed below). It is desirable to have a high ratio of maximum force exertable to back drive friction, because a higher ratio translates to a larger dynamic range of forces the device can exert.

As an example, the average maximum exertable force for a human's index finger has been estimated to be on the order of 50 newtons and previous studies have suggested that 40 newtons is an appropriate design maximum for a telerobotic handmaster. See generally, P. H. Sutter, J. C. Iatridis and N. V. Thakor, "Response to Reflected-Force Feedback to Fingers in Teleoperations," *Proc. of the NASA Conf. on Space Telerobotics*, pp. 65–74. NASA JPL, January 1989. However, it has been discovered that a lower force capability provides acceptable performance. For instance, an actuator that can exert a maximum force of only 8 newtons can be used in a system that can create the illusion of a solid wall.

For the embodiment shown above, with actuators that move as part of the counterbalance system, using smaller actuators permits faster response, higher bandwidth, and more flexibility in counterbalancing. It also minimizes the risk of harm or discomfort to the user. Using smaller actuators also facilitates meeting two additional desirable design criteria, that of minimizing back drive friction and of reducing the inertia of the device.

The device should have as little back drive friction as possible. Friction adds noise to the forces that the device attempts to present (reflect) to the user. It also creates a cue to the user that the non-local world is not natural. Significant friction can cause user fatigue. As has been mentioned above, it is desirable for the ratio of maximum force to back drive friction to be as high as possible to facilitate a wide dynamic range. Therefore, it is desirable for the friction to be as low as possible, particularly since it is also desirable to minimize the maximum exertable force needed.

In a typical device, friction can come from at least three sources: the bearings in the structure, the transmission from the actuators to the linkage, and the actuators themselves. The friction in the bearings and the transmission can be made very low. Therefore, the actuator technology places a lower limit on the friction that can be achieved, and thus, the upper limit on the ratio of maximum force to back drive friction. Although the ratio of maximum force to friction force may be fixed by a choice of actuators, the particular operating range of the forces is determined by the transmission ratio.

The device should also have a low inertia. The inertia of the device will not cause a significant problem if the user moves at a constant velocity. However, if the user accelerates or decelerates, the inertia of the system that is not an aspect of a physical system will give the user the undesirable sensation that an external mass is being borne by the user. Additionally, the inertia of the device also limits the bandwidth with which the device can respond to commands. Typically, all devices are capable of providing small forces rather slowly, or at steady state. Thus, it is the ability of the device to provide a relatively large force quickly that determines the bandwidth. It has been determined that, for a finger operated interface, it is beneficial to maintain the apparent mass felt by a user wearing the device to less than 100 grams. The apparent mass felt by the user is proportionally related to the inertia of the structure plus the reflected inertia of the motor. The reflected inertia of the motor armature is proportional to the transmission ratio, N, squared.

The device should be statically balanced at all points within its operating space. As with friction, an external force created by gravity acting on some unbalanced portion of the device can pollute the forces that the user experiences. Also, a constant offset in force can quickly lead to fatigue for the user. It is possible to actively compensate for imbalances in mechanical structure, however, this requires compromising the dynamic range of the actuators in the system. It is desirable for the balance to be maintained through a wide range of orientations with respect to ground. For example, as discussed below, the embodiment of the invention shown in FIG. 1 is statically balanced within 10 grams whether the base 116 is located gravitationally above or below the user connection gimbal 200.

There should be very little backlash in the transmission for several reasons. First, if the location of the user reference point of the device is to be calculated from the position of the actuators, the error in the calculated position will, at a minimum, be equal to the play in the transmission. Second, the backlash introduces a discontinuity in the force transmitted from the motors to the user contact assembly. While in the zone of backlash, the user does not feel the load of the motor on the other end of the transmission. However, as the user or the motor moves the device out of the backlash zone, a stiff transition is experienced as the motor is once again engaged. The non-linearities introduced by backlash also tend to destabilize some servo algorithms.

Small changes in finger position are easily discerned by human users. Even positional variations of less than 0.01 inches (0.254 mm) can be discerned and are thus unacceptable. Further, the force non-linearities created by backlash in the transmission are difficult to model and therefore make force control difficult. Thus, a system with zero backlash should be used.

The stiffness of the structure, transmission and the servo control loop determine the overall stiffness and bandwidth of the device. The stiffness of the structure and transmission can be made very high. Therefore, the limiting stiffness for the device disclosed is the servo-loop.

The maximum closed loop stiffness achievable with the stable servo-loop is a function of the inertia of the device, the impedance of the user's finger attached to the device the transmission ratio, the servo rate and the encoder resolution. Typically, the transmission ratio is the easiest of these factors to vary.

Finally, the position resolution of the device should be high, for two reasons. First, a high resolution enables the device, to reflect finer position details of a virtual environment. Second, the resolution of the encoders sets a limit on the stiffness of the control loop which can be closed and similarly limits the generation of viscous and inertial effects.

A preferred embodiment of the invention, as described above, accommodates the conflicting specification needs of the haptic system, discussed above. It uses three powered, tracked freedoms of motion and three free freedoms of motion. As has been discussed above, this provides for a faithful rendition of the interaction between a user's finger tip and the real world for a wide variety of finger activities. The device can exert and resist a Cartesian force vector with the user's finger, by using the motors to exert a torque upon the device joints. A data processing unit, shown schematically in FIG. 5, calculates the required motor torques by multiplying the Cartesian force vector by the transpose of a jacobian matrix, which relates the torques in the motors to the force at the user reference point 222 based on the geometry of the system and the positions of the actuators.

In order to size the actuators, the range of the workspace, and thus, the lengths of the links 106, 104, 102, must be selected. For the embodiment discussed above, the device has the first actuated joint located generally above the location of the user as wrist during use, and the sizes of the other elements allow users to move the wrist, knuckle and finger joints to all extremes without exceeding the workspace of device. The base disk portion 116 has a diameter of 4.5 in. (11.43 cm.). The disk 112 has a diameter of 3 in. (7.62 cm.). The length of the links between axis $B_2$ and hinge 110 is 5.5 in. ((13.97 cm.) and the length of the link between the hinge 110 and the intersection point 222 is 5.5 in. (13.97 cm.) and the distance between the hinges 110 and 108 is 1.25 in. (3.175 cm.).

With respect to the actuators, given a desired range of motion, a desired maximum exertable force and a transmission ratio, the necessary peak torque for the actuators can be found. Suitable actuators, weighing 130 grams, with a peak torque of 24 newton-centimeters, are available from Maxon, Inc., of Switzerland, under trade designation RE025-055-35EBA 201A. The motors use an ironless armature technology, which reduces torque ripple and minimizes the armature inertia. A high resolution encoder suitable for use with the selected actuator provides 2,000 counts per rotation, and is available from Hewlett-Packard of Palo Alto, Calif. under model number 5310.

In general, gear reduction transmissions available are subject to greater backlash than desired, as set forth above. A "direct-drive" may be used in certain circumstances. However, this requires using motors with a high stall torque. This would require using excessively large, heavy motors, which would result in large inertia and a generally bulky apparatus. Thus, for a system that simulate interaction of a user's finger with the physical world, a direct drive system has drawbacks. However, for a system that simulates interaction with a larger member, for instance a user's fist, or foot, such a drive may be suitable.

A cable transmission can meet the zero backlash specification with very little friction, and can also provide a transmission reduction. The backlash can be made zero by pretensioning the cable. Use of a cable transmission requires consideration of several factors. The cable routing should be such that radial forces on motor and capstan bearings are minimized. Cables that are wrapped around pulleys more than one full turn require a finite capstan width, because they "walk" across the capstan as it spins. The tension which a drive capstan can maintain on a cable is proportional to $e^{\mu\theta}$ where $\mu$ is the coefficient of friction between the cable and the capstan and $\theta$ is the angle through which the cable is wrapped around the capstan.

Cables have a finite minimum pulley radius around which they may travel without creating friction and being significantly fatigued. For instance, for cables sold by Sava corporation under trade designation ST-2032, suitable for use with the embodiment described above, 0.028 inches (0.71 mm) in diameter, the minimum radius is 0.2 in. (5.08 mm). Transmissions should avoid excessive free lengths of cables over long spans. Long lengths of free cables introduce compliance into the transmission. Further, pretensioned lengths of cables act as energy sources, which can lead to unwanted resonances at certain frequencies. Finally, it is often helpful to add a spiral groove to capstans. This insures that the cable travels in the same manner each time and that wraps of the cable do not scrape each other. This groove also effectively increases the friction coefficient between the cable and capstan, as well as also reducing the fatigue in the cable, both of which are desirable.

The embodiment of the invention shown generally in FIG. 1 provides an elegant arrangement by which the elements of the invention counterbalance each other to provide a static balance and to minimize inertia. It also simplifies the transmission. The motor 120, which actuates with respect to axis $B_1$, is stationary with respect to ground, and therefore, it does not contribute to the inertia of the device. However, the base 116, which forms part of the transmission with the actuator 120, does contribute to the inertia of the device around axis $B_1$. Therefore, it is beneficial in some instances to remove a portion (for instance, one half) of the disk that is not necessary for the transmission, in order to reduce the inertia. Such a configuration may not be balanced for all orientations, and therefore, it is not beneficial to use a partial disk in all situations.

The location of the two actuators 130 and 140, which cooperate to actuate motion in a plane perpendicular to axis $B_2$, act as counterweights to other portions of the assembly so that they substantially balance the structure statically at all points within the workspace. (Actually, the device is statically balanced to within 10 grams at all locations.) An advantage of this configuration is that it does not add any unnecessary mass to the apparatus to accomplish that static balance.

The means by which the counterbalance is achieved can be seen with reference to FIGS. 10A, 10B and 10C. The center of mass of the actuators 130 and 140, the links upon which they are carried, 356 and 106, the link 104, which is parallel to link 106, and the link 102 and gimbaled user contact assembly 200 remains at the axis $B_2$. For instance, if the link 106 is kept stationary with respect to the disk 112, actuator 140 is also kept stationary. If, at the same time, the gimbal assembly 200 is moved (as viewed in FIG. 10A) generally counter clockwise around axis $B_2$, to the position shown in FIG. 10B, the link 104 and the short link 356 move such that the actuator 130 is drawn counter clockwise around the disk 112 and the axis $B_2$. The lengths of the links and their masses are selected such that for a given relative motion, which is governed by the geometry of the links, the center of mass remains substantially at the axis $B_2$.

Similarly, motions of the gimbaled assembly 200 that cause rotation of the long shaft 106 around axis $B_2$, such as is shown in FIG. 10C, cause a corresponding motion of the actuator 140 around the same axis $B_2$, substantially counterbalancing the weight of the portions of the assembly on the other side of the axis $B_2$.

The two instances of counter balance discussed separately above, work together, so that any motion of the gimbal connection assembly 200 is counterbalanced by corresponding motions of both of the actuators.

In a preferred embodiment, only one cable 136 is used for both of the actuators 130 and 140. This has the advantage that it is necessary to install and pretension only a single cable for the two actuators. Further, the cable is routed so that pretensioning adds minimal axial and radial loads to the motor bearings.

The size of the drive capstans and the size of the shared pulley 112, upon which both the actuators 130 and 140 drive, are determined by several factors. Their relative sizes are chosen to maximize the reduction ratio, while still satisfying the following constraints. The shared pulley 112 must be large enough so that the actuators can move within 30 degrees of each other without touching. This pulley 112 may not, however, be so large, that it blocks the user's hand during normal use. It is also advantageous to keep the size of this pulley small, so that the rotational inertia of the two actuators and their transmissions about the base axis $B_1$ is small. Using capstans 144 and 134 of the minimum allowable size (discussed above) of 0.4 in (1.02 cm) and a disk 112 with a radius of 3 in (7.62 cm) results in a transmission ratio between the disk 112 and the capstans (134 or 144) of 7.5:1. Thus, for one actuator 130 or 140, the torque about the axis $B_2$ is 7.5 times larger than the torque exerted by either actuator. The range of motion of the device must be adjusted so that the static balance is achieved, given the sizing of the pulley 112.

Similar considerations contribute to choosing the transmission size for the base axis $B_1$. In the embodiment shown in FIG. 1, a slightly larger reduction is used, for two reasons. The inertia about the base axis is considerably larger than about the other two axes, $B_2$ and $B_3$. The larger reduction is used for the larger inertia so that the bandwidth about the base axis is comparable to the bandwidth about the other two axes. Further, the friction in the bearings of the structure was higher than that caused by the motor for this axis, so increasing the transmission ratio would not increase the back drive friction considerably. Therefore, the transmission ratio for the base axis may reasonably be from approximately 8.75:1 to 11:1.

For the apparatus described above, the maximum exertable force with the contact gimbal 200 located at the center of the workspace is approximately 8.5 newtons along the axes parallel to the long link 106 and the pendulum link 102, when so positioned. Due to the slightly higher transmission ratio, the maximum exertable force around axis $B_1$ is 9.5 newtons.

The apparent mass as felt by the user is not constant at all points within the workspace, due to geometric changes as the device moves. Typically, the apparent mass in any direction is between 60 and 95 grams. The device is statically balanced to within 10 grams for all points within the workspace. If desired, this imbalance can be compensated with the actuators.

Using the linkage shown, with preloaded bearings and a pretensioned cable, the backlash for the embodiment shown is zero.

Figure 9:
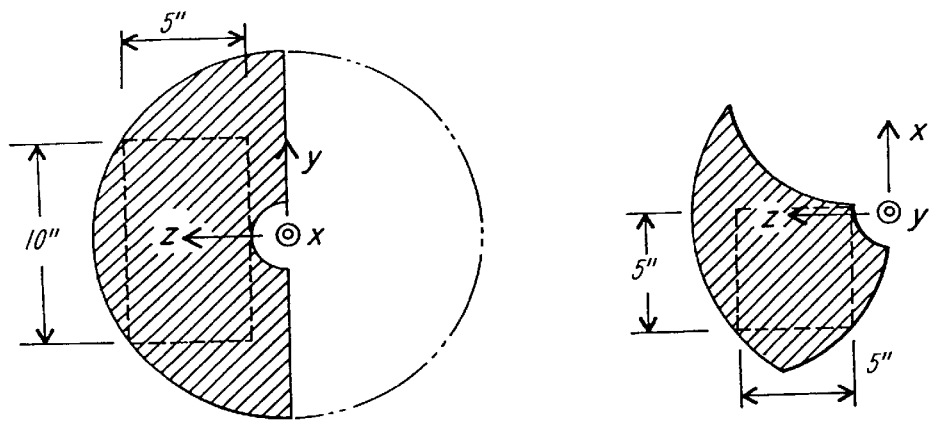
FIG. 9 is a schematic representation of the workspace for an embodiment of the invention as shown in FIG. 1.

The shape of the workspace available for the embodiment shown in FIG. 1 is shown in FIG. 9. The size of the workspace will depend on the general scale of the linkages. The dimension of the workspace shown in FIG. 9 as a cross-hatched half circle can actually be an entire circle, as shown in chain-dotted line, if the user is free to rotate fully.

In such a case, special accommodation may be required for any wires that are used to deliver current to the actuators. It should be noted that, as the position of the gimbal assembly 200 varies such that both x and y (as shown in FIG. 3, or FIG. 9) approach zero, a singularity arises, and the apparent mass of the device in the x and y directions approaches infinity.

Figure 5:
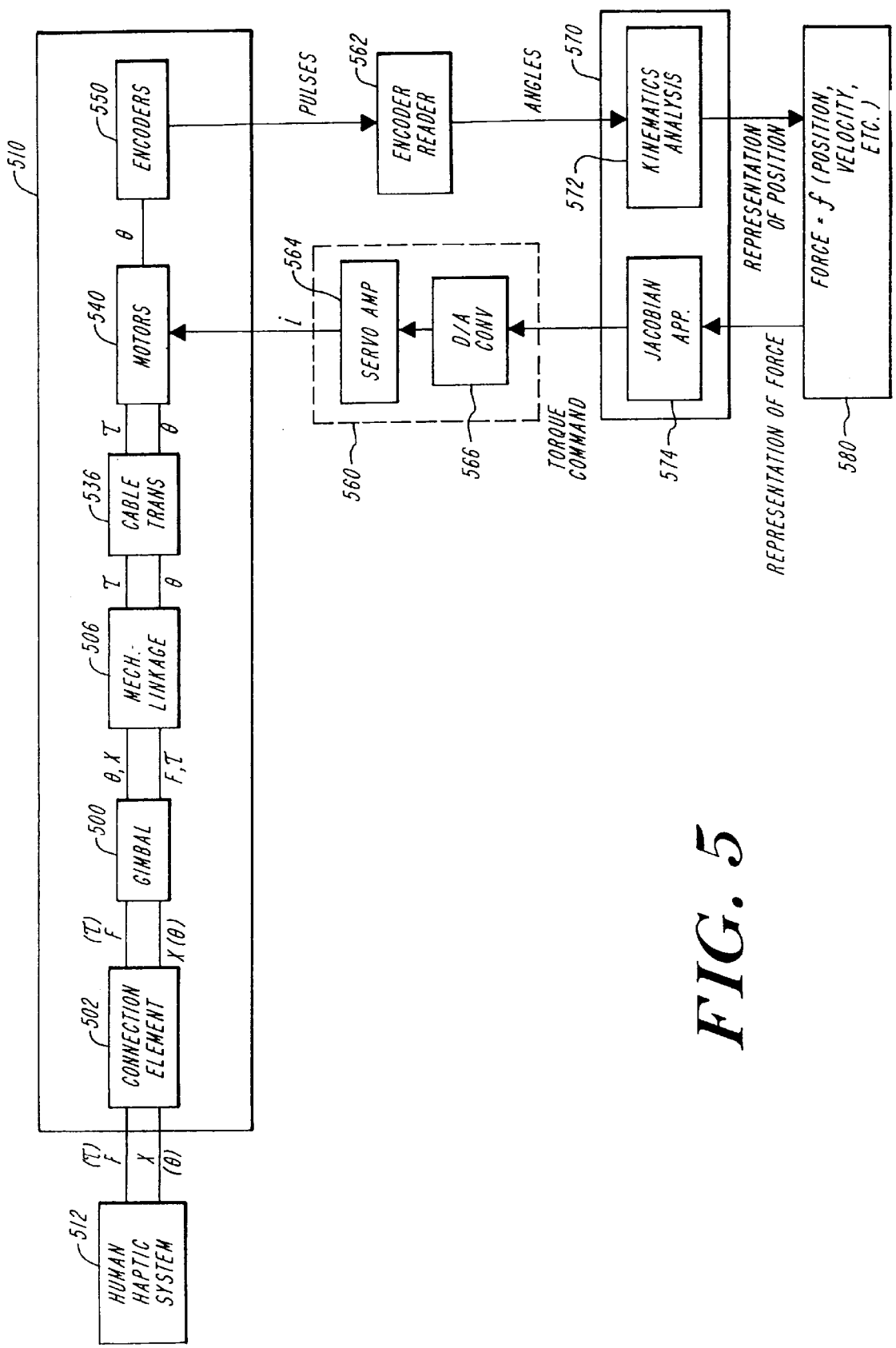
FIG. 5 is a schematic block diagram showing the exchange of signals between the human operator and a computer control system for the interface and a non-local environment.

The foregoing has described the electro-mechanical aspects of a typical force reflecting haptic user interface incorporating many aspects of the invention. In order to use such an electro-mechanical device in conjunction with a non-local environment (either physical or virtual), a control interface to the non-local environment must be provided. A typical interface is shown in FIG. 5.

An electro-mechanical device 510 analogous to that described above is connected to the human haptic system 512. The human haptic system is the human user's sense of touch. The electro-mechanical device 510 is connected to the human system 512. through a means that allows transmission of force (F) and position (x) signals in both directions: from human to device and from device to human. (In other embodiments of the invention, as discussed below, the communication between the two systems may also include torque ($\tau$) and angle ($\theta$) signals rather than, or in addition to the force and position signals. As used in this specification and the claims attached, when appropriate, such as when discussing the general properties of the invention, "force" includes within its meaning both linear forces and torques as well as their derivatives. Similarly, "position," or "location" includes within its meaning both linear positions and rotational positions, as well as the derivatives thereof of velocity, acceleration, etc.)

Figure 6:
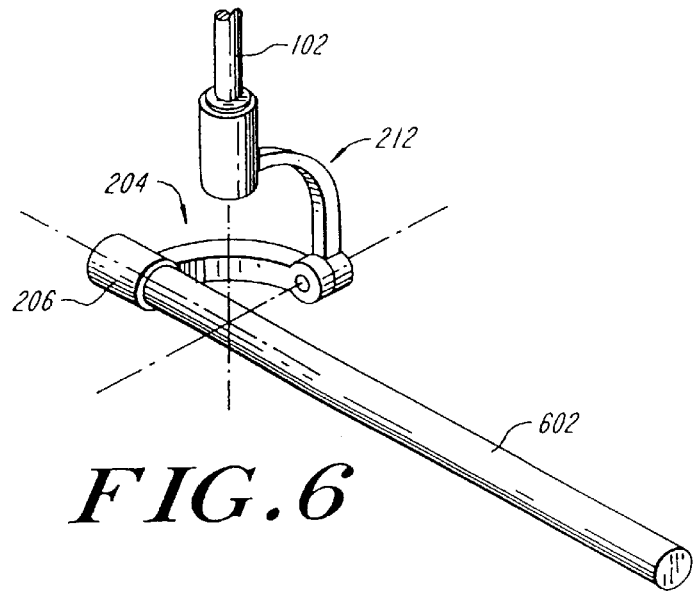
FIG. 6 is a schematic perspective view showing a portion of an embodiment of the invention having a stylus arrangement for a user to grasp with three free degrees of freedom.

The electro-mechanical apparatus includes an element 502 for direct user connection or contact, such as the thimble 202 shown in FIG. 1. (Another user connection element, a stylus 602 is shown in FIG. 6 and is discussed below.) In the embodiment discussed, which has three free freedoms of motion and three powered, tracked freedoms of motion, the user connection element 502 is connected to a free gimbal 500, through a connection that transmits force and position signals, i.e., a bearing. (This linkage cannot transmit torque or angle signals, although, in the general case, such signals could be transmitted at this point.)

The gimbal 500 is connected to the actuators 540 through a mechanical linkage 506 and a cable transmission 536 that together convert the force and position signals (and perhaps torque and angle signals) to torque and angular signals only. In the reverse direction, the mechanical linkage 506 and the cable transmission 536 together also convert torque and angular signals from the actuators to force and position signals (and perhaps torque and angle signals) to be presented to the gimbal 500.

The actuators discussed above, 120, 130 and 140, include rotational position encoders 550 (identified earlier as 121, 131 and 141), which keep track of the relative rotational positions of the axle of the actuators with respect to their respective body. This position is identified by pulse signals, which are transmitted from the encoders 550 of the electro-mechanical device 510 to encoder readers 562, which are part of an electrical input/output interface, which connects the electromechanical device 510 to a control apparatus 570, typically embodied in a general purpose computer that has been programmed for the purpose at hand. It is also possible to provide a dedicated device, rather than a programmed general purpose computer. The pulse signal from each encoder is received by an encoder reader 562, which converts the pulse signal into a signal representative of the angular position of each actuator axle relative to its body.

The angle signal is transmitted to the control device 570. A kinematics analysis unit 572 uses the angular positions of the motors, in conjunction with information about the static conformation of the electromechanical device 510, to determine the location in the user's local environment of the user reference point of the connection element 502, or any other portion of the electromechanical device 510 desired. The information about the device's static conformation includes the length and orientation of its various linkages, transmission ratios, etc.

In the typical application, this user's position signal is transmitted to an entity in the non-local environment. The entity may be a physical slave device in a remote physical environment, or a computer representation of an entity in a virtual, computer environment. It may also be a computer representation of data in such a computer environment, such as the data representing temperatures over time or space.

To simplify discussion, it will be assumed initially that the non-local entity is a physical device in a physical environment. There is a mapping of locations in the local environment to the non-local environment. The signal representative of position transmitted from kinematics analysis unit 572 may be representative of the location where the user desires to place a portion of a slave device in the non-local environment. Suitable control devices are provided to move the slave device according to the user's position instruction. In the non-local environment, the slave device encounters the environment in such a way that the device experiences a force upon it. This force is measured by instrumentation provided in connection with the slave device, for instance strain gauges, or the current through actuators, and is communicated from the slave environment, typically as an electric signal, back to the control apparatus 570. Thus, the schematic block 580 may be a physical system, comprising a slave device, its environment, and connections to and from it.

As an example, the slave device can be a simple, finger like wand, which moves about an enclosed space. When it touches a wall in the slave environment, a signal is generated that relates to the forces between the slave wand and the wall. As another example, the slave device can be identical to the device shown schematically in block 510

The control apparatus 570 includes a Jacobian application unit 574, which converts the electrical signal representing the force in the non-local environment to an electrical signal that represents the torques that the actuators in the local environment must apply to generate a corresponding force signal between the user and the user connection element 502. To make this conversion, the Jacobian application unit includes and manipulates information regarding the conformation of the electro-mechanical device, as well as the current position of the user reference point 222. This information is very similar and is related to the information used by the kinematics analysis section 572.

The torque command is passed to a Digital to Analog conversion unit 566, which converts the torque command into a current, based on the specifications of the particular actuators being used. This current is typically amplified by a servo amplification unit 564 and is transmitted to the actuators 540 in the electromechanical device 510. The current applied to the actuators 540 results in a torque between the body and the axle, which either moves the connected linkages, or results in a force being presented to the human user's haptic system 512. The user moves or does not move, depending on the magnitude of the force and the task being performed.

The foregoing discussion assumes that the non-local environment 580 is a physical environment with a physical slave device. It is also possible for the non-local environment to be a virtual, computer generated environment, with a virtual slave device. For instance, the non-local environment can be a representation of an enclosure, with various objects distributed throughout. The slave device can be a point that moves throughout the virtual environment, encountering the objects and the enclosures. The position of the moving point in the virtual environment is dictated by the location of the user reference point 222 in the real, physical master environment. The virtual environment, represented by schematic diagram block 580, generates a force signal, which is returned to Jacobian analysis unit 574 according to the rules under which the virtual environment operates. The designer may provide for a force signal to be generated when the point moves to a virtual location at which a virtual object resides. The magnitude of the force, and the spatial domain over which it exists depends on whether the designer wishes to give the perception of an immovable object, a rigid or soft object, etc.

Typically, the control unit 570 consists of an appropriately programmed general purpose digital computer. For the embodiment discussed above, a Gateway 2000 Intel 80486 based clone of an IBM personal computer, operating at 66 MHz is suitable. The electrical interface 560 is made up of three twelve bit digital to analog convertors and three current control, servo amplifiers, available from Copy Controls Corp., of Massachusetts, under product designation Model #303, a power amplifier and other basic electronics for the computer interface.

The servo loop as described in general above has a gain associated with it, and this gain is the primary factor in determining the overall stiffness of the device. The rate at which the computer can close a servo loop around the motors is a significant limiting factor in setting the gain for an embodiment of the invention as has been described. At a servo rate of 1 KHz, a stiffness of 16 newtons/cm is achievable. At a servo rate of 2 KHz, a stiffness of 32 n/cm. can be obtained. The factors that contribute to the servo rate are the number of clock cycles required by the program controlling the computer to complete a servo loop, and the processor speed. Increasing the processor speed or decreasing the number of processor cycles required increases the servo rate, and thus the effective stiffness of the device up to a point in processor speed, after which other considerations begin to come into effect.

The foregoing discussion has focused on an arrangement where a master device connected to a user drives a slave device in a non-local environment. Because force feedback is two-way in nature, the invention can be used with two users, each in their own local environment, and each using a user connection device such as discussed above, connected to a control device that transmits the forces from one to the other. Thus, each device would act as both a slave device and a master device. Each user could engage the other, attempting to move the other, or feeling the motions of the other.

The invention is not limited by the nature of the non-local environment. Any non-local environment may be used in conjunction with the user contact device of the invention.

Figure 12:
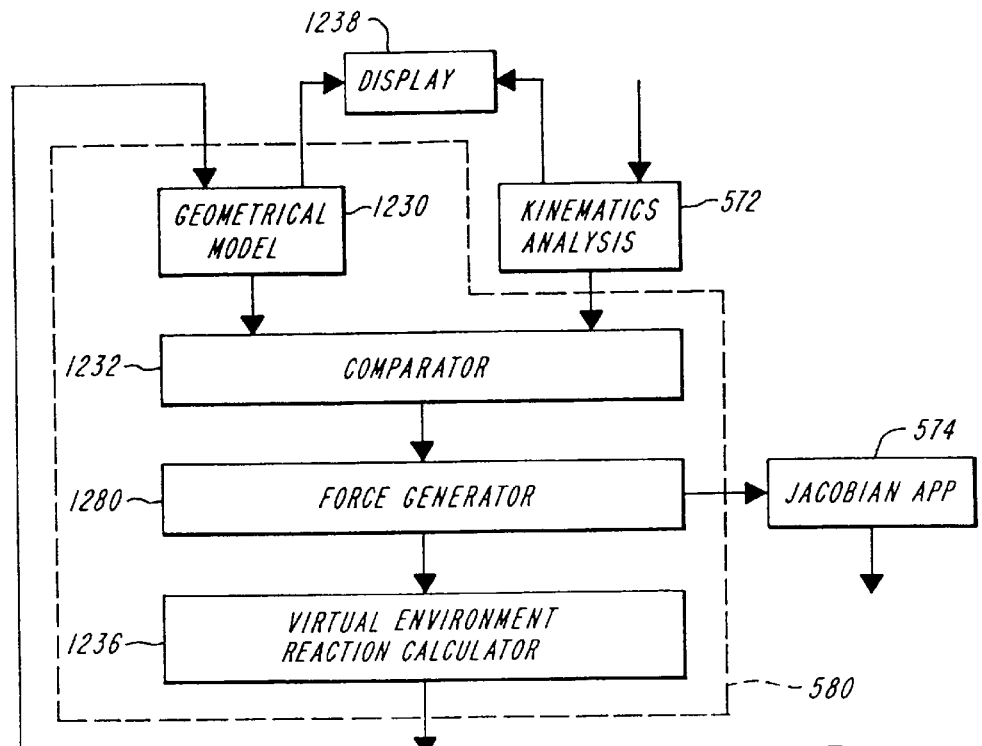
FIG. 12 is a block diagram showing schematically the elements of an embodiment of the apparatus of the invention that controls a virtual environment.

A schematic block diagram of elements that may be used to provide a user interface with a virtual environment is shown in FIG. 12. Such a device is connected to a hardware apparatus such as shown in FIG. 1 and discussed above. The virtual environment is generated by the force control element 580 shown generally in FIG. 5. FIG. 12 shows the elements that generate the virtual environment in more detail.

A geometrical model residence 1230 keeps a record of the geometry of the virtual environment. The geometry is pre-established. Typically, the residence stores data with a mathematical representation of the environment, establishing zones, two and three dimensional objects, boundaries, a reference frame, etc. It can be implemented simply in a computer memory or other equivalent device.

As has been mentioned above, the output of the kinematics analysis element 572, shown in FIG. 5, is a signal representing the position of a user reference point (or line, as discussed below) of the user apparatus shown in FIG. 1, relative to the reference frame in the user's local environment. For instance, the user reference point may be the intersection 222 of the three G axes. The geometrical residence 1230 also includes a representation of the reference frame for the user's local environment, and maps that reference frame to some aspect of the virtual environment.

The output of the kinematics analysis unit is provided to a comparator 1232, which compares the location of the user's reference point or line, with the location of zones and objects, boundaries, etc. in the virtual environment.

If there is a display device 1238, such as a video screen, it is beneficial to display on such device a graphical representation of the virtual environment, and also, a graphical representation or abstraction of the user contact apparatus, and its location relative to the virtual environment (in accordance with the mapping between the reference frames of the physical and virtual environments).

Connected to the comparator is a force generator 580, which corresponds to the force generator shown in FIG. 5. This component applies force related rules based on the characteristics of the virtual environment to the location, (and location derivatives of velocity, acceleration, etc.) of the user reference point, and generates a signal representative of a force. For instance, if the environment is a cubic enclosure with hard walls, if the location of the user reference point is not coincident with any of the walls, the force generator 580 generates a signal representing zero force to be reflected back to the user. However, if the user moves the reference point such that it falls within the space that coincides with a wall, the force generator generates a force signal. For a simple example, the walls are modeled as very stiff springs, having a constitutive relationship of F=kd, where F is the force signal, k is a constant, and d is the distance by which the user reference point has passed beyond the plane of the wall before contact. Thus, the further the point is "beyond" the virtual wall, the greater will be the resisting force.

Common experience is that very hard walls do not admit of any intrusion beyond their rest plane. Consequently, if a very hard wall is being represented in the virtual world, k takes on a large number. Softer walls, such as a carpet covered wall, or an elastic wall like a plastic window, are represented with smaller k values.

Traditional control theory principals dictate permissible values for k, and these depend on the overall compliance of the system, the speed at which the apparatus can perform the required calculations, the resolution of the actuators, the resolution of the D/A convertors, etc.

In any case, the force generator 580 generates a signal representing the force that would arise between a point and an object having the characteristics of a wall, in the conformation dictated by the location of the point. This force signal is passed to the Jacobian application unit 574, which determines what signals should be sent to the motors so that the user feels the appropriate force, e.g., F=kd, at the connection element.

The force signal is also passed to a virtual environment reaction calculator 1236, which determines if any changes should be made to the geometrical representation of the virtual environment. As has been mentioned above, the zones in the virtual environment are defined by rules as to how they should transform, if a force is applied to them. For instance, a perfectly rigid wall does not deform, or change at all. Therefore, no matter how much the user tries to push against the location of such a wall, it should not move. Thus, the representation of it should not move, and, the user should feel a force generated each time the user moves the connection point to a location that coincides with the wall. However, if the virtual wall is elastic then the force calculator generates only a limited force in response to the user's intrusion beyond the rest plane of the wall. If the user persists in opposing this force, the elastic wall should remain at the displaced position dictated by its constitutive relation F=kd. Thus, the representation of the virtual environment is also changed to reflect the new position of the wall.

Rather than a wall, the zone in which the point is found can be a zone representing a movable object, having mass. In such a case, the rule governing the force to generate and the change in the virtual environment differs from a simple F=kx relationship, and includes information regarding the acceleration of the point, and thus, the object. Therefore, the reaction calculator must store enough time history of the moving user connection point and the objects in the virtual environment so that it can calculate the reaction of a mass according to an F=ma type relation, where, again, F is the force between the user and the device, m is the mass of the virtual object and a is the acceleration of the virtual object in its environment.

The reaction calculator determines the new conformation of the virtual environment and provides this information to the geometry model residence 1230, as well as to a display 1238, if present.

Figure 13:
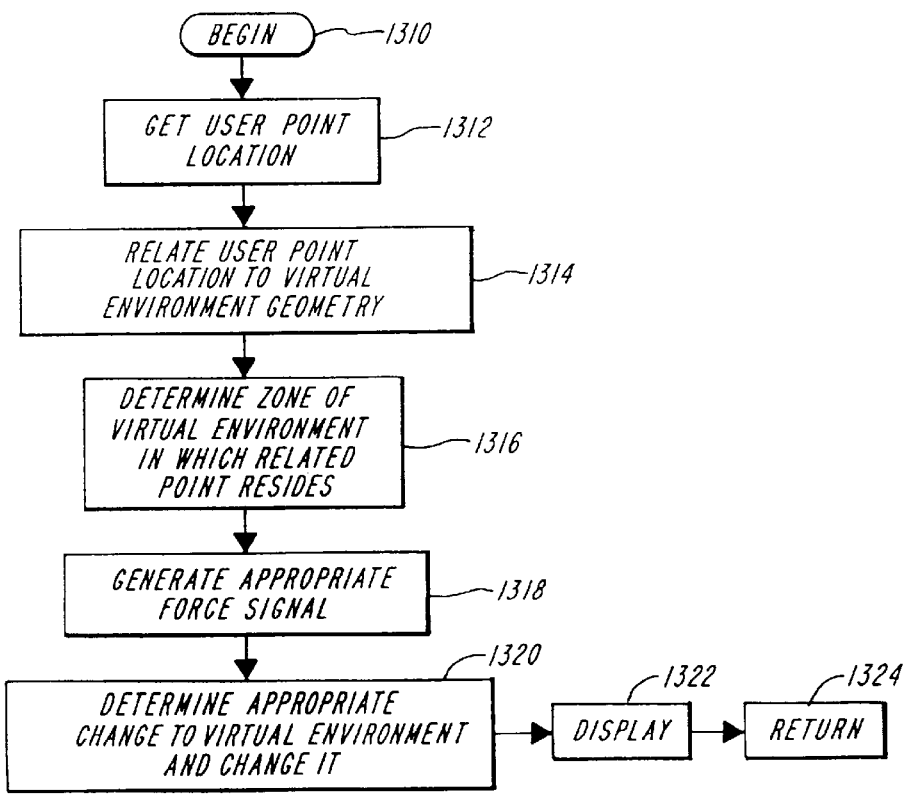
FIG. 13 is a flow chart representation of a method embodiment of the invention for controlling a virtual environment.

The invention also includes a method of generating a force feedback signal based on making the comparisons between the physical location of the user connection reference point and the virtual environment. The steps of this method are set forth with reference to FIG. 13. These method steps are repeated over and over again, as quickly as the hardware employed can complete all of the calculations and display all that is required.

The method begins at 1310. The location of the user point is received 1312, for instance, from a kinematics analysis unit. Next, the location of the user reference point is related 1314 to the geometry of the virtual environment, by virtue of a mapping of the designer's choosing between the reference frame of the virtual environment and the physical apparatus. It is then determined 1316 in what zone of the virtual environment the mapped user reference point resides. Based on the zone, an appropriate force signal is generated 1318. This signal, as mentioned above, depends on the particular constitutive relationship for the zone, the location within the zone of the user reference point, as well as the location history, such as velocity, acceleration, etc. This force signal is transmitted to the user apparatus, as has been discussed.

The constitutive rules also govern how the virtual environment should change, based on the location and motions of the user reference point. These necessary changes are calculated at 1320, and the record or image, or representation of the virtual environment is changed accordingly. If a display is being used, the present state of the virtual environment and the user reference point is displayed 1322. The process returns 1324 to the beginning, to get the next location of the user reference point and to again determine the effect between the virtual environment and the user.

The embodiment that has been described models a point type interaction with its environment, with three active, powered tracked freedoms and three passive, untracked, unpowered freedoms. Such a device may be used to interact with any portion of the user's body, such as the finger, hand, head, buttocks, foot, tongue, mouth, etc. The size and conformation of the apparatus and the type of connection element can be adapted for such use.

The same combination of freedoms may also be used in conjunction with a user contact element that is shaped like a stylus, such as is shown at 602 in FIG. 6. Otherwise, the device is identical to that which has been described. The user may grasp the stylus in any appropriate manner. As with using a ball point pen, it is typically irrelevant to the function of the pen as to how it is rotated relative to its long axis. (This is not true with respect to a fountain pen or a chisel point calligraphy pen.) Similarly, it does not typically matter how the pen is oriented with respect to two orthogonal axes that are perpendicular to its long axis. What matters is the location of the pen tip. Is its tip on a writing substrate or not? Has it been dragged from one location on the substrate to another, or has it been lifted away from the substrate?

Thus, with the stylus type connection element 602, a user can direct a stylus type slave device in a non-local environment. For instance, the slave device can be a paint brush. It can be real, or virtual. If real, the user will be able to control not only the locations where the paintbrush touches a substrate to be painted, sources of paint, etc. The user will also be able to control the degree to which the brush is pushed toward the substrate after contact has been made, thus spreading out the bristles of the brush and thereby controlling the thickness of the painted line. The user will also be able to feel the effects of paper texture, brush compliance, brush and paper friction, pigment viscosity, etc.

If the slave device is virtual, the designer can provide that the user feels the substrate/stylus combination give away, or spring, analogous to a real paintbrush on painting substrate. Thus, the harder the user pushes against a spring resistance, and consequently the closer toward the virtual substrate, the virtual paintbrush handle has moved, the wider will be the virtual mark that is made by the virtual paintbrush on the virtual substrate. Such an embodiment can be implemented using a software program that establishes a plane for the virtual substrate, and notes the position of the user's stylus, and identifies a bristle portion thereof. After the virtual bristle portion contacts the virtual substrate, a spring force is generated in the actuators to simulate the springiness of real bristles, with the force being proportional to the distance moved after virtual contact. The width of the mark made depends on this distance also.

This facilitates a realistic computer screen painting program that accommodates varying line widths in a natural manner, rather than preselecting line widths, as is commonly done. Different types of brushes can be simulated, by changing the relation that relates the force to the displacement and to the mark width.

A bristle brush is a specific implementation of the general class of objects that change their cross-section under a force with a component perpendicular to the plane of the cross-section. Others include sponges, felt tip markers, elastomeric erasers, etc. These items are referred to generically as "diagonal"-type items.

It is also possible to provide the plane of the virtual substrate with various textures, such as one simulating glass, rough water color paper, canvas, etc. Similarly, the pigment medium can be simulated, based on its viscous characteristics. To accomplish this, in addition to the location of the user reference point, its location history must be recorded, since viscous elements have a constitutive relation based on relative velocities.

Similarly, the compliance or springiness of a virtual substrate upon which marks are being made can be simulated, varying between hard surfaces, like a single sheet of paper supported on a metal desk and soft surfaces, like the same piece of paper supported by a stack of paper.

Textures of surfaces can be modeled in the geometry model, by contacting a user connection device with a physical sample of a selected substrate, and moving the contact device over its surface, thereby generating movement of the user connection device such as would arise if a physical paintbrush (or other tool) were being drawn across a physical substrate. These motions can be recorded, and used to define a virtual surface of the type of the sample. Various types of samples can be thus treated, and a library of surfaces can be obtained.

Textures can also be simulated, as a rippled wall, with the ripple dimensions and regularity depending on the texture to be simulated.

In the context of the hardware apparatus discussed above with respect to FIG. 12, the force generator 1280 generates a force based on the springiness of a virtual bristle element that is being compressed and dragged.

Other applications for the embodiment generally as shown above are within the contemplation of the invention and will be understood by one of ordinary skill in the art. Any situation that can be modeled on a computer is a candidate for use with the interface of the invention. The embodiment discussed with reference to FIGS. 1 and 6 is characterized in general by having a user contact element that is a rigid body, such as the thimble or the stylus. The apparatus powers three freedoms through which the rigid body moves, and also tracks motions through those freedoms. With respect to the other three freedoms of the rigid body, the apparatus neither powers them nor tracks them. However, they are available for the user to move through.

In general, a rigid body's interaction with the physical world is described in terms of six freedoms of motion, commonly organized as motions orthogonal along three orthogonal axes and rotations and torques with respect to three orthogonal axes. As has been mentioned, an important aspect of the invention is the realization that effective interaction with a physical or virtual environment can be had with a user interface where fewer than all six freedoms of motion of a rigid portion of the connection device are powered. The foregoing examples use three powered and tracked freedoms and three unpowered, untracked freedoms. It is also possible to track, but not to power the three unpowered freedoms.

Figure 7:
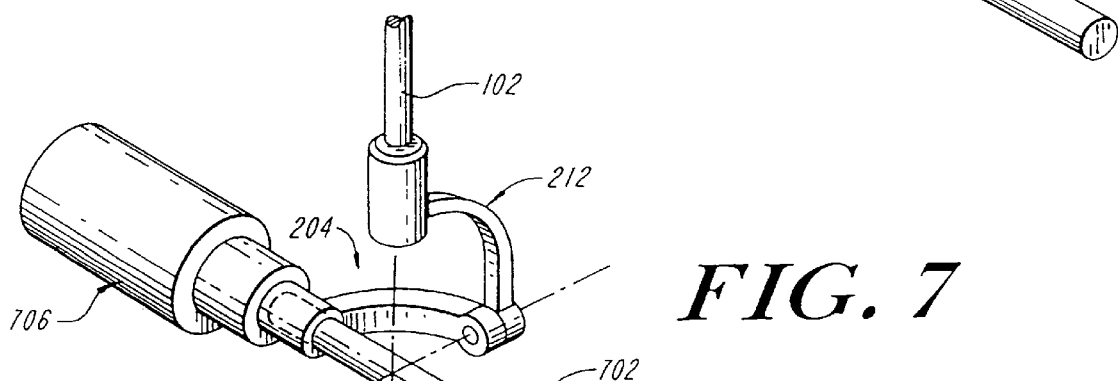
FIG. 7 is a schematic perspective view showing a portion of an embodiment of the invention having a handle interface for a user to grasp and exert torque with two free degrees of freedom and with one powered degree of freedom.

An embodiment of the invention using four powered and tracked freedoms and two unpowered, untracked freedoms is shown schematically with reference to FIG. 7. The user contact element 702 has a handle 701, similar to a conventional screw driver handle. A shaft 703, rigidly fixed to the handle forms, or is rigidly attached to the axle of an actuator 706, the body of which is rigidly held by the arm of the quarter-gimbal 704. Otherwise, the apparatus is configured substantially the same as that shown in FIG. 1.

The actuator 706 is equipped with an internal encoder, just like the actuators 120, 130 and 140 discussed above, so that it can track the rotational location of the handle relative to the body. It is also connected (through electrical cables not shown) to an interface to a control apparatus similar to module 570, which processes the location information generated by the encoder, and generates a torque command, that is translated into a current signal, delivered to the actuator 706 so that it provides an appropriate resistance to the user's motions, given the conditions in a non-local environment. As before, the non-local environment may be physical or virtual.

This embodiment would be useful for a user to participate in certain screwdriver type activities. These would include tightening and loosening threaded mechanisms, twirling spaghetti on a fork, etc.

In some cases, such as for simulating using a screw driver, it may be beneficial to locate the actuator in the handle 701, and to fix the shaft 703 to the quarter gimbal 204. This still provides the powering of the freedom, and it places the mass of the motor in the handle, which is where the mass of a screwdriver resides. Thus, reality is simulated without need of extra masses to counter balance the mass of the actuator.

It is also beneficial to provide an position sensor 706 which includes an encoder for determining the rotational position of the handle 702, but which does not include a motor to power motions through this freedom. This embodiment would be useful in situations where the position conveys information, but where there is no need to provide a torque feedback to the user. Examples of such situations include where the user makes a selection by rotating a dial to a position that the user verifies visually. The advantage to eliminating the motor is that the weight is significantly reduced, and thus the counter balance and inertia considerations are easier to satisfy. Further, if it is not necessary to calculate a torque through this freedom, the control apparatus is simplified.

Figure 8:
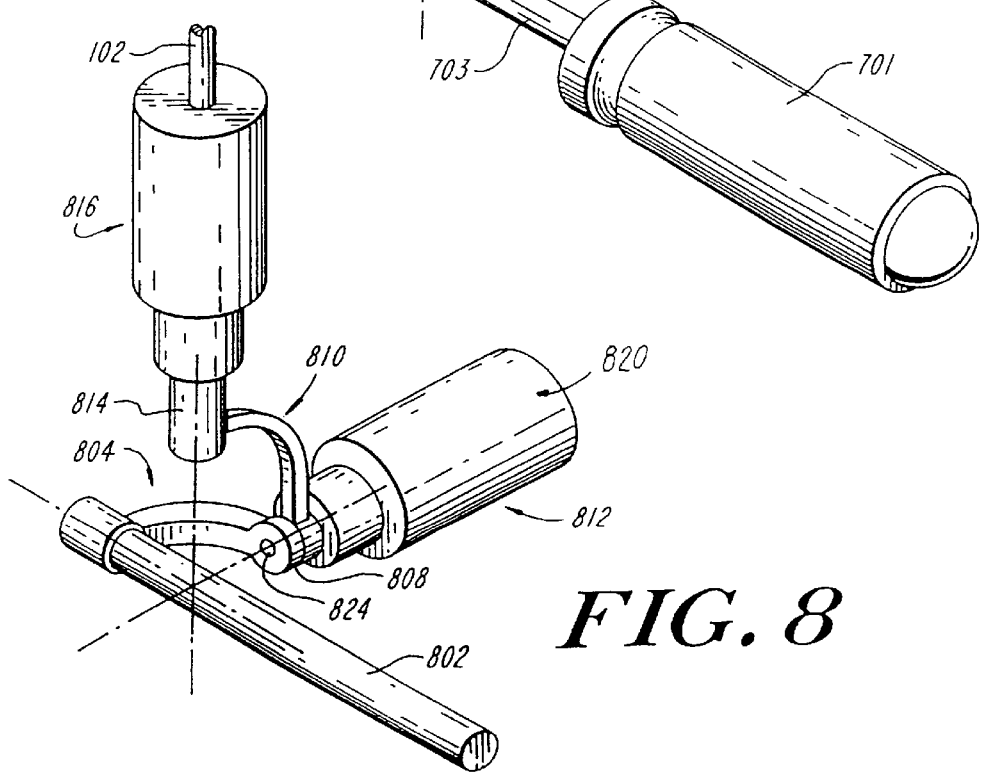
FIG. 8 is a schematic perspective view showing a portion of an embodiment of the invention having a wand interface that allows a user to sense contact with virtual objects at various points along the length of the wand with one free degree of freedom and with two powered degrees of freedom.

Another embodiment of the user connection assembly of the invention is shown schematically with reference to FIG. 8, which shows an assembly having two powered, tracked freedoms and one unpowered, untracked freedom. The remaining portions of the apparatus are substantially the same as that described above, i.e., three other powered and tracked freedoms. The user contact element 802 in this case is a wand. It is connected to the end quarter-gimbal 804 free to rotate about its long axis, just like the stylus described above in connection with FIG. 6.

An actuator 816 is provided, the body of which is rotationally fixed with respect to the link 102 through which it is connected to the rest of the apparatus and ground. The axle of the actuator 816 is fixed to one end 814 of the medial quarter gimbal 810. The other end 820 of the medial quarter gimbal 810 is fixed to the body 820 of another actuator 812. The axle 824 of this actuator 812 is connected to the end 808 of the end quarter gimbal 804, to which the stylus 802 is attached freely rotatably as described.

This device can facilitate the user's interaction with the non-local environment along a line, analogous to the way a blind person uses a cane to identify the location and general size and shape of obstacles in a local environment. The person probes the environment with the cane. The cane may encounter objects at any point along the length of the cane, and at any location around the long axis of the cane. It does not matter to the user's perception of the world how the wand itself is situated rotationally with respect to its long axis. Similarly, the environment reacts in the same way to interactions with the cane regardless of its rotational orientation about its long axis. Thus, for this embodiment, there is a user reference line, rather than a user reference point.

Both of the actuators shown in FIG. 8 may include position encoders and motors. However, as discussed above with respect to the screw driver type embodiment certain circumstances may require that only one of the freedoms be powered with a motor, with the other freedom simply tracked with an encoder. Further, it may also be advantageous to provide two position transducers, neither of which have the torque transmitting capacity of an actuator, both providing only an position sensing. Motions of great symphony conductors can be recorded and used to conduct provincial symphony orchestras, either after the fact or in real time.

The foregoing illustrations are not meant to limit the generality of the invention. The following table shows the various combinations of powered (P), tracked (T) and free (F) (i.e. neither powered nor tracked) freedoms of motion that are contemplated as aspects of the invention. Basically, all such combinations having at least three powered, tracked freedoms and at least one unpowered freedom are included in the invention.

TABLE 1

| Powered | Not Powered | Not Powered | Not Powered | Not Powered |
| --- | --- | --- | --- | --- |
| 3P | 3T | 3F | 2T1F | 1T2F |
| 4P | 2T | 2F | 1T1F | |
| 5P | 1T | 1F | | |

The invention also contemplates all possible locations for the freedoms that are powered. For instance, in FIG. 7, motion around the long axis of the stylus is powered and motion around the other two axes of the gimbal assembly are not powered. It is also part of the invention if freedom about either of these other two axes alone is the powered freedom, rather than about the axis shown. Similarly, any combination of powering two axes, as shown in FIG. 8 are part of the invention.

The invention is shown in FIG. 1 with the location of the user contact assembly 200 generally located gravitationally below the grounded support 118. It can also be used flipped from top to bottom, so that the user contact assembly is above the support 118.

The device can be used in any other orientation, but in some instances, it may be necessary to adjust the shapes and weights of the components that must counterbalance each other, since in some aspects they will balance and in others they will not. As has been mentioned above, the "ground" can be any reference frame chosen by the designer. The ground can even be a part of the user's body different from that which connects to the devise at the user reference point 222, or it can be floating, for instance, a buoy in the sea.

Figure 11:
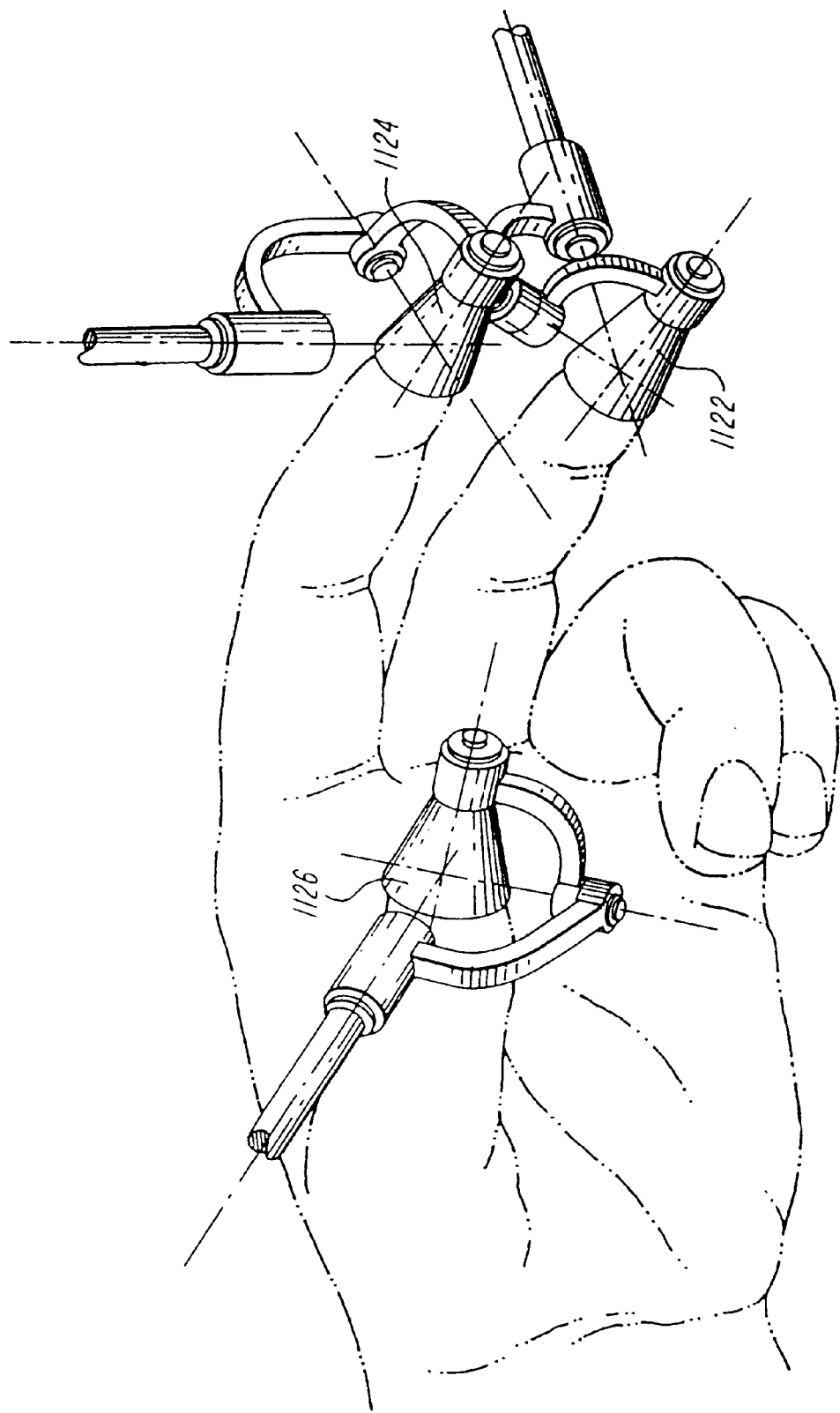
FIG. 11 is a schematic perspective representation of a user's fingers connected to three gimbal assemblies, with the remainder of each apparatus not shown.

As shown schematically in FIG. 11, it is also beneficial to use at least two of the devices together, one 1126 manipulated by a user's thumb and the other(s) one (or more) 1122 and 1124, by the other fingers of the same hand. In this manner, the user can grasp objects in the non-local environment between the two or more fingers of the non-local apparatus. The use of the quarter-gimbal end assembly facilitates this arrangement, since the thimble 202 is only hindered on one side.

Applications for the invention are many. They include simulated or remote operation of machinery or musical instruments. For instance, a user could operate a non-local piano with one device attached to each finger of both hands, and to one foot, for the pedal. Pedal operated slave machines can be operated by a user with such an apparatus connected to the foot. The device can be used by a doctor to probe a bullet wound in a patient at a distant location, searching for bullet fragments. Surgeons can use the device to take "dry runs" of certain procedures, using data from the actual patient. For instance, scans of a patient's head can be taken and provided. The two or three dimensional data representing the head is the non-local environment, and is, in fact, a virtual environment, including tumors, wounds, etc. A virtual needle probe can navigate through this space, generating force signals that would be appropriate depending on the compliance, mass, motion, etc. of the regions of data. These force signals can be used to provide force feedback to a stylus type user connection apparatus, as shown in FIG. 6, giving a surgeon an idea of what it will feel like to conduct the procedure on the living patient. In this way, the surgeon achieves a "hands on" simulation that may show problems with blockage, obstructions, etc. The surgeon may rely on both the sense of touch and vision to plan a delicate operation.

The invention can be used by attaching one user connection element to each of a user's feet to permit walking through a virtual terrain.

The invention can be used to train a blind person to use a cane in a totally safe environment, simulating potential hazards, like stairs, walls, holes in the ground, etc.

There are many possible uses for the invention as part of a computer interface. For instance, it can be used with the now familiar desk top metaphor for computer files and documents. Known interfaces typically use a mouse, with buttons and a trackball. The realism of the representation of desk top may be enhanced with use of the invention. The items in the virtual environment could be picked up with the invention, in a more realistic way than is now possible. The apparatus described can give the impression of encountering objects having edges, weights, textures, etc. Pages can be turned by actually grasping. Documents can be moved by nudging, grasping and moving, etc. Larger, or more important files can be made to seem heavier, thicker, etc. Different objects can have different textures, etc.

Another computer interface use relates to the pressing of virtual buttons, or flicking of toggle type switches. For instance, a push button can be represented on a computer screen by a perspective view. When the user reference point encounters the zone of the button, its surface can be felt by the user. If the user presses against the interface, a spring resistance is generated by the force generator 1280, and is felt by the user, the resistance following an F=kd relation as discussed above. If the user pushes against this force for a distance equal to the common throw of a switch, a threshold is passed, after which the force generator generates no resistance at all. A short distance more and the force generator generates a firm resistance, as if the button were locked in a depressed position. Thus, the user experiences a threshold that gives a definite feeling of having made a transition. In other words, a function that would specify the spring force versus displacement is non-linear.

Similarly, for a toggle type switch, such as a wall light switch, a spring resistance is provided as the switch is moved from side to side, until it crosses a threshold, after which it snaps away. Other variations on switches, having multiple positions and engagement and release modes are also possible.

The actuators can be rotary or linear motors, pneumatic devices and any other suitable force or torque transducers.

The connection element between the user and the apparatus, for instance a thimble, or a stylus, may be tension bearing, compression bearing, or both. For instance, a loop of string may bear tension, but not compression. A point or flat plate may bear compression, but not tension. A snug fitting thimble, a stylus that is grasped, etc., may bear both.

The invention can also be used to enhance the usefulness of the display of three dimensional data on a visual display device, such as a computer screen. Such data, when displayed, is often ambiguous, due to the fact that a three-dimensional item is being displayed on a two dimensional medium. Using the invention allows the user to actually feel the configuration of the data in a virtual three dimensional space. Data spanning more than three dimensions can be displayed to the tactile senses by having additional dimensions represented by texture, motion, etc.

One of the embodiments discussed above uses three actuators to power three freedoms. It is also common to power three freedoms using more than three actuators, for instance, if it is desired to give the ability to locate a point and to navigate through obstructions. In such a case, an additional elbow type joint may facilitate circumventing such obstructions. Similarly, more than three free joints may be used to provide three free freedoms. The invention includes such multi-joint apparati. What is required is that there be a user connection element, and that three freedoms of the user connection element be powered and at least one freedom of the user connection element not be powered.

The foregoing discussion should be understood as illustrative and should not be considered to be limiting in any sense. While this invention has been particularly shown and described with references to preferred embodiments thereof, it will be understood by those skilled in the art that various changes in form and details may be made therein without departing from the spirit and scope of the invention as defined by the claims.

Having described the invention, what is claimed is:

1. An apparatus for generating a signal representative of force comprising:
   a. a receiver for receiving a signal representative of the location of a user reference point relative to a user reference frame;
   b. a geometry model residence for storing a representation of:
      i. a non-local reference frame;
      ii. the user reference frame, relative to said non-local reference frame; and
      iii. the conformation of a, non-local environment comprising a switch-type, spring-type element, relative to said non-local reference frame;
   c. a comparator for comparing the location of the user reference point relative to the non-local environment; and
   d. a force generator for generating a signal representative of a force, based on the location of the user reference point relative to the non-local environment and a set of force rules, including spring-force rules which specify a switch output force signal in response to a location signal of said user reference point indicative of a deflected conformation of said spring-type element, said switch output force signal being specified by a non-linear function.

2. The apparatus of claim 1, further comprising a non-local environment reaction calculator that makes changes to the representation of the conformation of the non-local environment based on the signal representative of force and the set of force rules.

3. The apparatus of claim 2, said spring force rules specifying a change in the representation of the conformation of the non-local environment in response to a location signal of said user reference point indicative of a deflected conformation of said switch-type element.

4. The apparatus of claim 3, said change in the conformation of the non-local environment comprising a change in the conformation of the representation of the switch type element.

5. The apparatus of claim 4, said switch-type element comprising a switch having at least two positions, said change in conformation of the representation of the switch type element comprising a change from one position to another of said at least two positions.

6. An apparatus for generating a signal representative of force comprising:
 a. a receiver for receiving a signal representative of the location of a user reference point relative to a user reference frame;
 b. a geometry model residence for storing a representation of:
  i. a non-local reference frame;
  ii. the user reference frame, relative to said non-local reference frame; and
  iii. the conformation of a, non-local environment comprising a diagonal-type, spring-type element, relative to said non-local reference frame;
 c. a comparator for comparing the location of the user reference point relative to the non-local environment;
 d. a force generator for generating a signal representative of a force, based on the location of the user reference point relative to the non-local environment and a set of force rules, including spring-force rules which specify a diagonal element output force signal in response to a location signal of said user reference point indicative of a deflected conformation of said diagonal-type element; and
 e. a non-local environment reaction calculator that makes changes to the representation of the conformation of the non-local environment based on the signal representative of force and the set of force rules, said diagonal element spring-type rule specifying a change in the representation of the cross-sectional area of a selected region of said diagonal-type element.

7. The apparatus of claim 6, said set of force rules including a plurality of selectable different spring-force rules that specify a diagonal element output force signal, thereby facilitating a plurality of relationships between said spring-force output signal and the location of said user reference point indicative of a deflected conformation of said diagonal-type element.

8. The apparatus of claim 6 said force generator further generating forces based on the time history of the location of the user reference point relative to the non-local environment and a set of force rules, including friction-type rules which specify a friction output force signal in response to the time history of the location signal of said user reference point indicative of a change in position over time of the user reference point.

9. The apparatus of claim 6, said non-local environment further comprising an indicia of the cross-sectional area of said selected region of said diagonal-type element.

10. The apparatus of claim 9, said geometrical model residence further comprising means for storing a representation of said indicia of the cross-sectional area of said diagonal-type element as it changes over time.

11. A method for generating a signal representative of force, said method comprising the steps of:
 a. receiving a signal representative of the location of a user reference point relative to a user reference frame;
 b. storing a representation of:
  i. a non-local reference frame;
  ii. the user reference frame, relative to said non-local reference frame; and
  iii. the conformation of a, non-local environment comprising a diagonal-type, spring-type element, relative to said non-local reference frame;
 c. comparing the location of the user reference point relative to the non-local environment; and
 d. generating a signal representative of a force, based on the location of the user reference point relative to the non-local environment and a set of force rules, including spring-force rules which specify a diagonal element output force signal in response to a location signal of said user reference point indicative of a deflected conformation of said diagonal-type element;
 e. changing the representation of the conformation of the non-local environment based on the signal representative of force and the set of force rules, said diagonal element spring-type rule specifying a change in the representation of the cross-sectional area of a selected region of said diagonal-type element.

12. The method of claim 11, further comprising the step of maintaining in said representation of said non-local environment an indicia of the cross-sectional area of said selected region of said diagonal-type element.

13. The method of claim 12, further comprising the step of storing a representation of said indicia of the cross-sectional area of said diagonal-type element as it changes over time.

14. The method of claim 13, further comprising the step of displaying said representation of said indicia of the cross-sectional area of said diagonal-type element as it changes over time on a visual display.

15. An apparatus for physically exchanging a force with a user in a user-local environment, comprising:
 a user connection element; and
 a linkage physically linking said user connection element to a reference, said linkage providing at least six independent degrees of freedom to said user connection element, said linkage comprising:
  an actuator system powering at least three of the at least six independent degrees of freedom of said user connection element relative to the reference;
  wherein at least three of the at least six independent degrees of freedom of said user connection element are free-of-power relative to the reference.

16. The apparatus of claim 15 wherein said linkage further comprises at least two linked orthogonal bearings.

17. The apparatus of claim 15 wherein said linkage further comprises a sensor determining a position of said user connection element relative to the reference with respect to the at least three powered degrees of freedom.

18. The apparatus of claim 15 wherein said user connection element is capable of exchanging an attractive force and a repulsive force with a user.

19. The apparatus of claim 15 wherein said actuator system further comprises at least one ironless armature motor powering at least one of the at least three powered degrees of freedom of said user connection element.

20. The apparatus of claim 15 wherein said linkage further comprises a plurality of interconnected links, at least one of the plurality of interconnected links being mechanically coupled to said user connection element and wherein said actuator system further comprises:

at least one ironless armature motor powering at least one of the at least three powered independent degrees of freedom; and a cable transmission mechanically coupling said motor to said plurality of interconnected links.

21. The apparatus of claim 15 wherein the reference is a portion of the user's body.

22. The apparatus of claim 15 wherein said linkage further comprises a link and wherein said actuator system further comprises a pair of actuators more distal to the reference than said link, each actuator being connected to said link through a cable and being movable relative to each other and relative to said link.

23. The apparatus of claim 15 wherein said actuator system further comprises:

an actuator powering at least one of the at least three powered independent degrees of freedom of said user connection element; and a cable transmission mechanically coupling said actuator to said linkage.

24. The apparatus of claim 15 wherein said actuator system receives a non-local signal from a non-local environment and powers the at least three powered independent degrees of freedom of said user connection element relative to the reference in response to the non-local signal.

25. The apparatus of claim 24 wherein said linkage further comprises a sensor tracking the at least three powered degrees of freedom and sending a master signal to the non-local environment in response to the tracked at least three powered degrees of freedom.

26. The apparatus of claim 15 wherein said linkage further comprises a sensor determining a position of said user connection element relative to the reference with respect to at least one of the at least three free-of-power degrees of freedom.

27. The apparatus of claim 26 wherein said actuator system powers the at least three powered degrees of freedom in response to the position of said user connection element with respect to the at least one sensed free-of-power degree of freedom.

28. The apparatus of claim 15 wherein said linkage further comprises at least two masses that are movable relative to the reference, movable relative to each other and movable relative to said user connection element such that the center of mass among said at least two masses and said user connection element remains substantially stationary relative to the reference despite motion of said user connection element.

29. The apparatus of claim 28 wherein at least one of said at least two masses comprises actuator.

30. The apparatus of claim 15 wherein said linkage further comprises a plurality of interconnected links, at least one of the plurality of interconnected links being mechanically coupled to said user connection element, and wherein said actuator system further comprises:

an actuator powering at least one of the three powered degrees of freedom of said user connection element; and a flexible transmission member mechanically coupling said actuator to said plurality of interconnected links.

31. The apparatus of claim 30 wherein said actuator is an ironless armature motor.

32. The apparatus of claim 30 wherein said actuator comprises a motor having a capstan with an exterior surface, the exterior surface having a groove extending at least a portion of the circumference of said capstan, wherein said groove is sized and shaped to engage said flexible transmission member.

33. The apparatus of claim 30 wherein said actuator system comprises a motor having a capstan, and wherein said flexible transmission member extends along at least a portion of a perimeter of one of said plurality of interconnected links and is intracrossed forming a loop, said loop being engaged on said capstan.

34. The apparatus of claim 15 wherein said linkage further comprises first and second linked orthogonal bearings and a third bearing, which is linked to and orthogonal to one of either the first or second linked bearings.

35. The apparatus of claim 34 wherein each of said first, second and third bearings has an axis of rotation, each of the axes of rotation coinciding at a user reference point.

36. The apparatus of claim 35 wherein said user connection element comprises a thimble into which a body member of the user may be inserted, said thimble being arranged such that the user reference point is within the body member when inserted into said thimble.

37. An apparatus for physically exchanging a force with a user in a user-local environment, comprising:

a user connection element comprising a rod; and a linkage physically linking said user connection element to a reference, said linkage providing at least four independent degrees of freedom to said user connection element, said linkage comprising:

an actuator system powering at least three of the at least four independent degrees of freedom of said user connection element relative to the reference;

wherein at least one of the at least four independent degrees of freedom of said user connection element is free-of-power relative to the reference.

38. The apparatus of claim 37 wherein said actuator system further comprises at least one ironless armature motor powering at least one of the at least three powered degrees of freedom of said user connection element.

39. The apparatus of claim 37 wherein said linkage further comprises a plurality of interconnected links, at least one of the plurality of interconnected links being mechanically coupled to said user connection element and wherein said actuator system further comprises:

at least one ironless armature motor powering at least one of the at least three powered degrees of freedom; and a cable transmission mechanically coupling said motor to said plurality of interconnected links.

40. The apparatus of claim 37 wherein the reference is a portion of the user's body.

41. The apparatus of claim 37 wherein said actuator system further comprises:

an actuator powering at least one of the at least four independent degrees of freedom of said user connection element; and a cable transmission mechanically coupling said actuator to said linkage.

42. The apparatus of claim 37 wherein said linkage further comprises a sensor determining a position of said user connection element relative to the reference with respect to the at least one free-of-power degree of freedom.

43. The apparatus of claim 42 wherein said actuator system powers the at least three powered degrees of freedom in response to the position of said user connection element with respect to the at least one free-of-power degree of freedom.

44. The apparatus of claim 37 wherein said linkage further comprises a plurality of interconnected links, at least one of the plurality of interconnected links being mechanically coupled to said user connection element, and wherein said actuator system further comprises:

an actuator powering at least one of the three powered degrees of freedom of said user connection element; and a flexible transmission member mechanically coupling said actuator to said plurality of interconnected links.

45. The apparatus of claim 44 wherein said actuator system comprises a motor having a capstan, and wherein said flexible transmission member extends along at least a portion of a perimeter of one of said plurality of interconnected links and is intracrossed forming a loop, said loop being engaged on said capstan.

46. An apparatus for physically exchanging a force with a user in a user-local environment, comprising:

a user connection element comprising a rod; and a linkage physically linking said user connection element to a reference, said linkage providing at least five independent degrees of freedom to said user connection element, said linkage comprising:

an actuator system powering at least three of the at least five independent degrees of freedom of said user connection element relative to the reference;

wherein at least two of the at least five independent degrees of freedom of said user connection element are free-of-power relative to the reference.

47. An apparatus for physically exchanging a force with a user in a user-local environment comprising:

a user connection element comprising a rod; and a linkage physically linking said user connection element to a reference, said linkage providing at least five independent degrees of freedom to said user connection element, said linkage comprising:

an actuator system powering at least four of the at least five independent degrees of freedom of said user connection element relative to the reference;

wherein at least one of the at least five independent degrees of freedom of said user connection element are free-of-power relative to the reference.

48. An apparatus for physically exchanging a force with a user in a user-local environment, comprising:

a user connection element comprising a rod; and a linkage physically linking said user connection element to a reference, said linkage providing at least six independent degrees of freedom to said user connection element, said linkage comprising:

an actuator system powering at least five of the at least six independent degrees of freedom of said user connection element relative to the reference;

wherein at least one of the at least six independent degrees of freedom of said user connection element are free-of-power relative to the reference.

49. A method for physically exchanging a force between an apparatus and a user in a user-local environment, comprising the steps of:

a. providing an apparatus comprising:
  i. a user connection element; and
  ii. a linkage physically linking said user connection element to a reference, said linkage providing at least six independent degrees of freedom to said user connection element, said linkage comprising:
  an actuator system powering at least three of the at least six independent degrees of freedom of said user connection element relative to the reference, three of the at least six independent degrees of freedom remaining free-of-power relative to the reference;

b. connecting said user connection element to a body member of a user; and c. powering the at least three of the at least six independent degrees of freedom of said user connection element.

50. The method of claim 49 wherein the step of powering the at least three of the at least six independent degrees of freedom further comprises the step of generating a signal in a non-local environment and powering the at least three of the at least six independent degrees of freedom in response to the non-local signal.

51. An apparatus for physically exchanging a force with a user in a user-local environment comprising:

a user connection element; and a linkage physically linking said user connection element to a reference, said linkage providing at least two independent degrees of freedom to said user connection element, said linkage comprising:

an actuator system comprising an ironless armature motor, said actuator system powering at least one of the at least two independent degrees of freedom of said user connection element relative to the reference, wherein at least one of the at least two independent degrees of freedom of said user connection element is free-of-power relative to the reference.

52. The apparatus of claim 51, wherein said motor has a capstan and wherein said linkage further comprises:

a plurality of interconnected links; and a flexible transmission member mechanically coupling said capstan to said plurality of interconnecting links, said flexible transmission member extending along at least a portion of a perimeter of one of said plurality of interconnected links and being intracrossed forming a loop, said loop being engaged on said capstan.

* * * * *